Oct. 9, 1934.       C. D. LAKE ET AL       1,976,617
TABULATING MACHINE
Filed May 23, 1933        21 Sheets-Sheet 1

Oct. 9, 1934.  C. D. LAKE ET AL  1,976,617
TABULATING MACHINE
Filed May 23, 1933  21 Sheets-Sheet 2

INVENTORS
ATTORNEY

Oct. 9, 1934.  C. D. LAKE ET AL  1,976,617
TABULATING MACHINE
Filed May 23, 1933  21 Sheets-Sheet 4
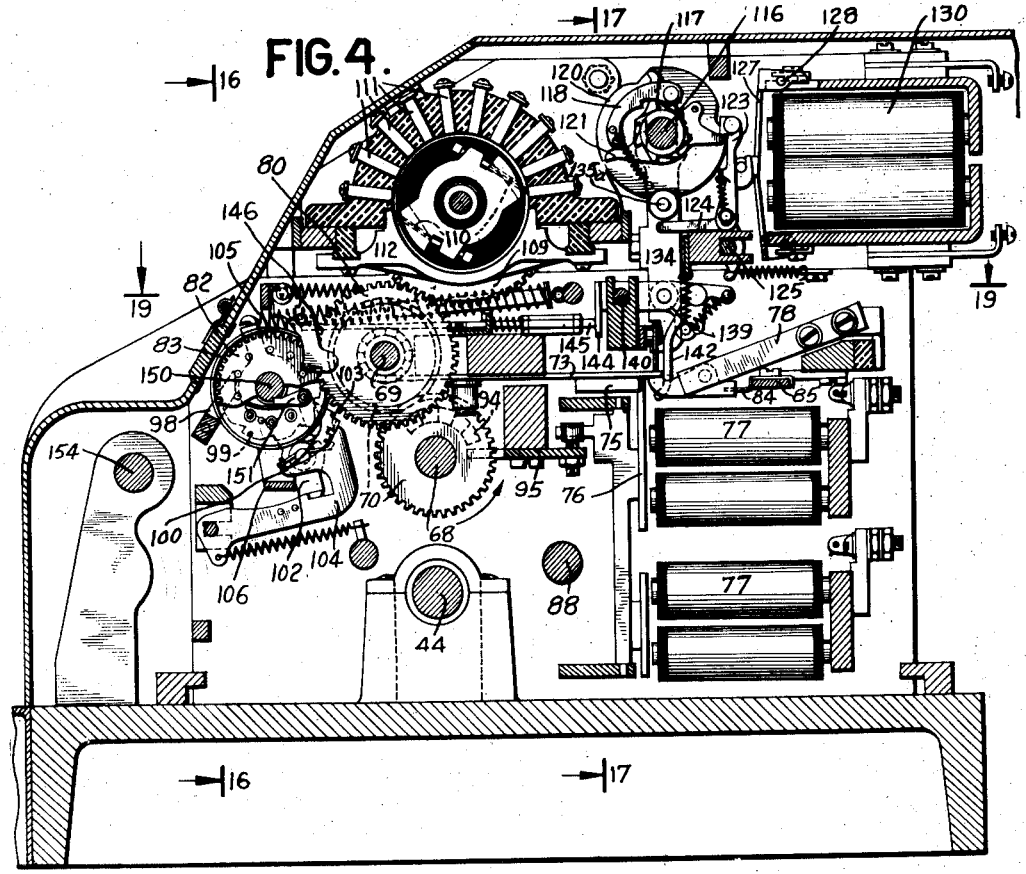
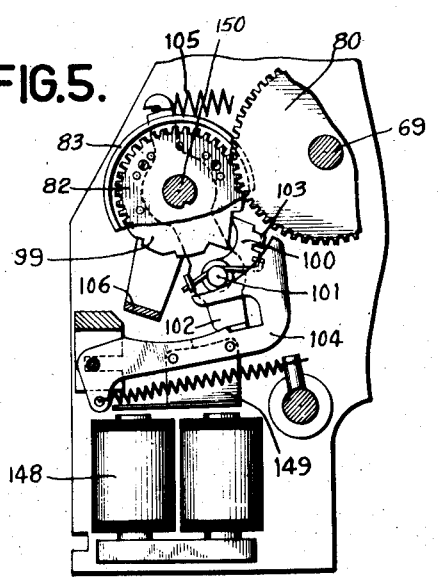
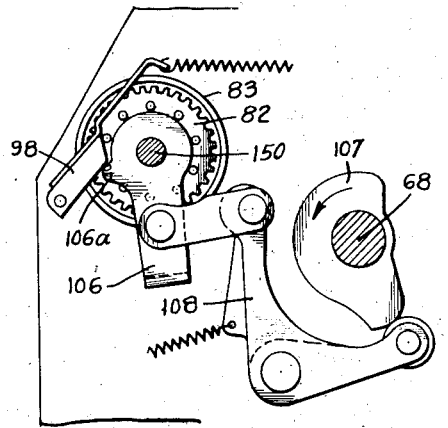
INVENTORS
ATTORNEY Oct. 9, 1934.  C. D. LAKE ET AL  1,976,617
TABULATING MACHINE
Filed May 23, 1933  21 Sheets-Sheet 6

Oct. 9, 1934.  C. D. LAKE ET AL  1,976,617
TABULATING MACHINE
Filed May 23, 1933  21 Sheets-Sheet 7

INVENTORS
ATTORNEY

Oct. 9, 1934.  C. D. LAKE ET AL  1,976,617
TABULATING MACHINE
Filed May 23, 1933   21 Sheets-Sheet 8

Oct. 9, 1934.  C. D. LAKE ET AL  1,976,617
TABULATING MACHINE
Filed May 23, 1933  21 Sheets-Sheet 10

INVENTORS
ATTORNEY-

Oct. 9, 1934.  C. D. LAKE ET AL  1,976,617
TABULATING MACHINE
Filed May 23, 1933   21 Sheets-Sheet 11

INVENTORS
BY
ATTORNEY

Oct. 9, 1934. C. D. LAKE ET AL 1,976,617
TABULATING MACHINE
Filed May 23, 1933 21 Sheets-Sheet 12
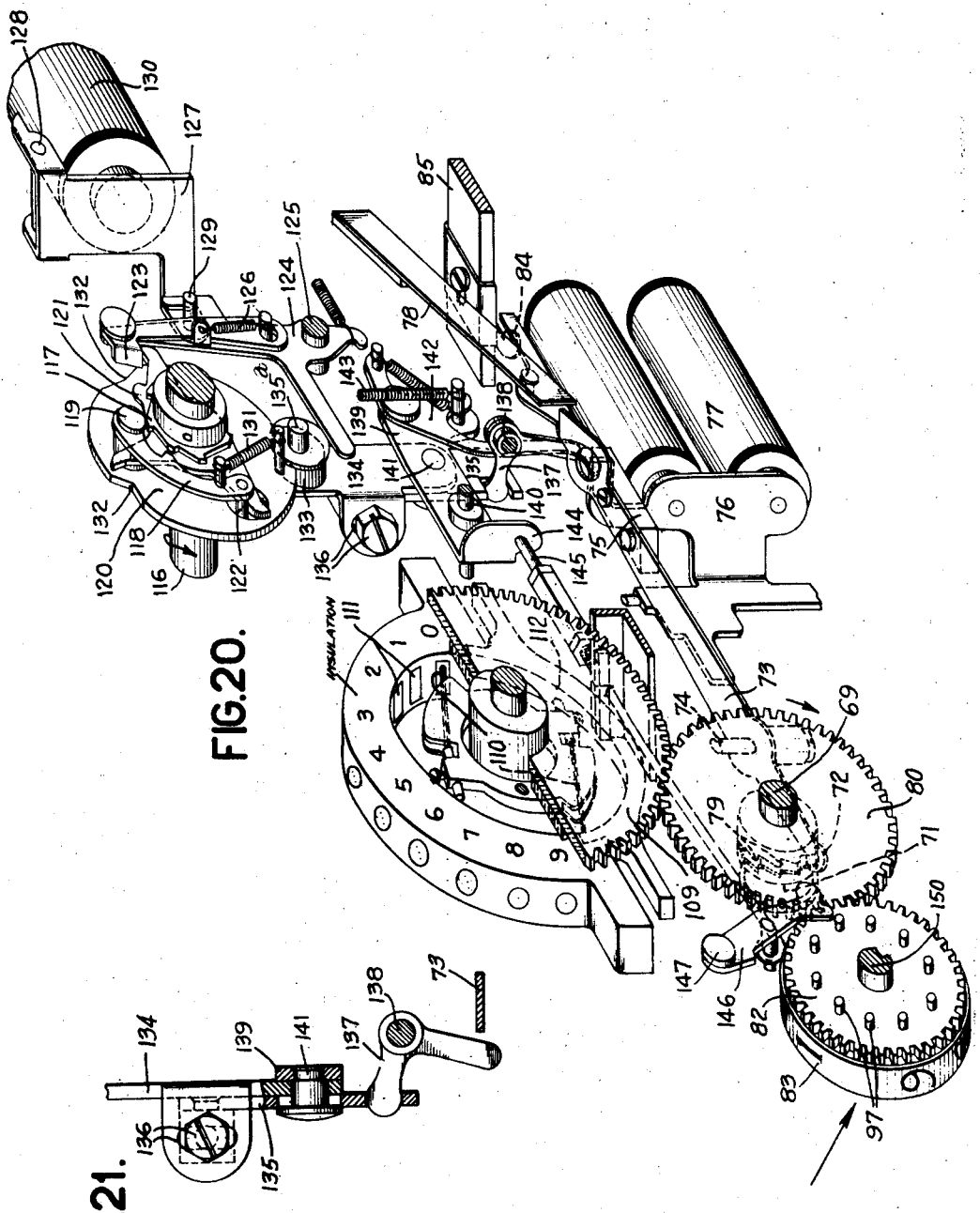

Oct. 9, 1934.  C. D. LAKE ET AL  1,976,617
TABULATING MACHINE
Filed May 23, 1933    21 Sheets-Sheet 13

INVENTORS
BY
ATTORNEY

Oct. 9, 1934.　　C. D. LAKE ET AL　　1,976,617
TABULATING MACHINE
Filed May 23, 1933　　21 Sheets-Sheet 14

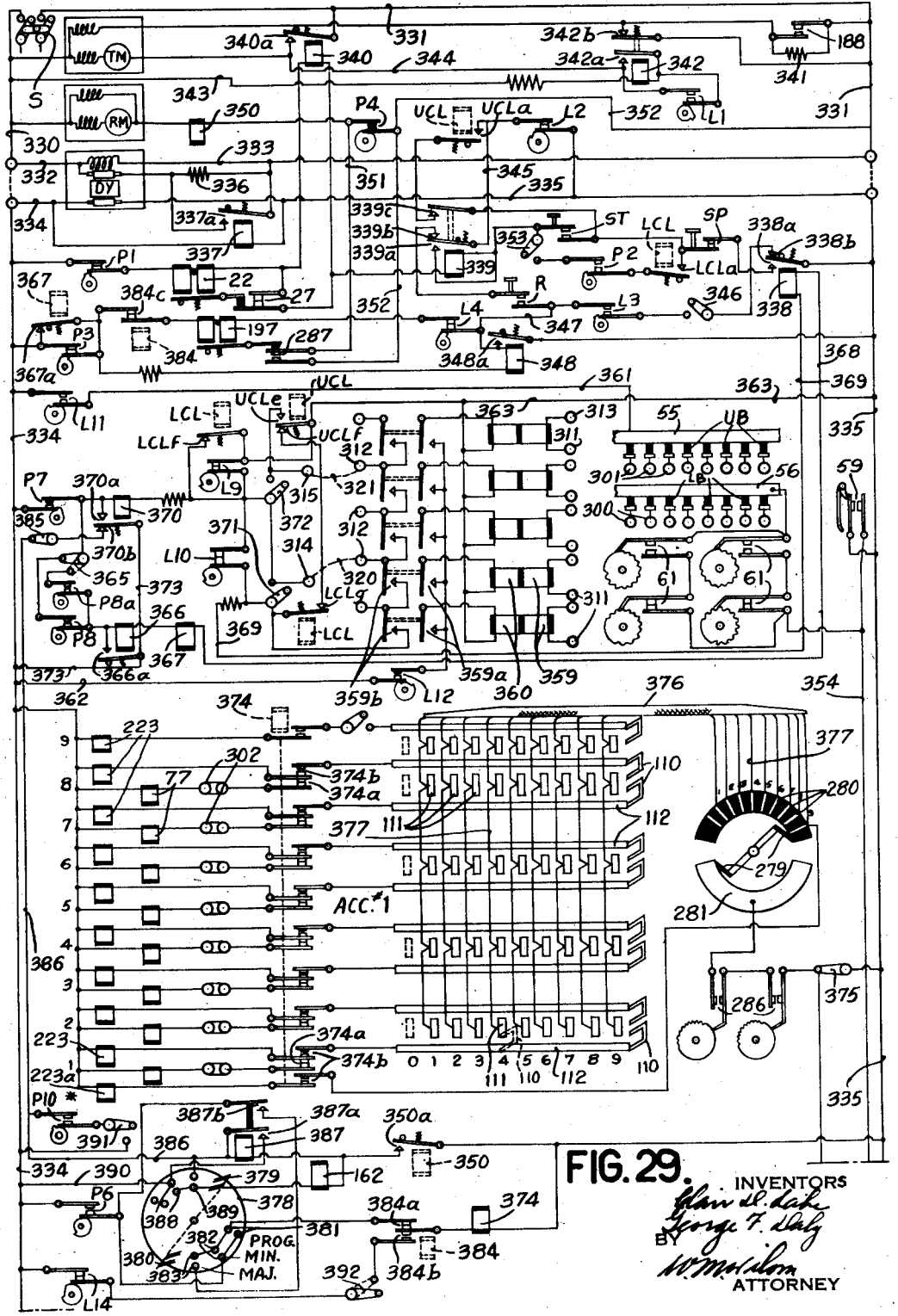

Oct. 9, 1934.  C. D. LAKE ET AL  1,976,617
TABULATING MACHINE
Filed May 23, 1933  21 Sheets-Sheet 17

Oct. 9, 1934.  C. D. LAKE ET AL  1,976,617

TABULATING MACHINE

Filed May 23, 1933  21 Sheets-Sheet 18

Oct. 9, 1934.   C. D. LAKE ET AL   1,976,617
TABULATING MACHINE
Filed May 23, 1933    21 Sheets-Sheet 19

INVENTORS
BY
ATTORNEY

Oct. 9, 1934.   C. D. LAKE ET AL   1,976,617
TABULATING MACHINE
Filed May 23, 1933     21 Sheets—Sheet 20

Oct. 9, 1934.  C. D. LAKE ET AL  1,976,617
TABULATING MACHINE
Filed May 23, 1933  21 Sheets-Sheet 21

INVENTORS
Clair D. Lake
George F. Daly
BY
W. M. Wilson
ATTORNEY

Patented Oct. 9, 1934

1,976,617

UNITED STATES PATENT OFFICE 1,976,617

TABULATING MACHINE

Clair D. Lake, Binghamton, and George F. Daly, Johnson City, N. Y., assignors, by mesne assignments, to International Business Machines Corporation, New York, N. Y., a corporation of New York Application May 23, 1933, Serial No. 672,388

16 Claims. (Cl. 235—92)

This invention concerns accounting machines and more particularly accounting machines of the record controlled tabulator type.

The principal object of the invention is to provide a tabulating machine of improved selectivity of operation and of increased utility, together with simplification and improvement of the wiring and switching arrangements and improvement of the mechanical structure with a view to imparting additional operating features as well as improvement in and increased efficiency and utility of the features previously found in such machines.

Record cards of the well-known Hollerith type in which data are represented by perforations in index point positions are successively fed through the card feeding and analyzing section of the machine wherein the perforations are analyzed for the purpose of controlling the operation of the accumulating and printing mechanisms of the machine. The various units of the machine have been modified to the end that greater operating speed is possible than in previous machines of the same general type.

Another object of the invention is to provide a tabulating machine with subtracting accumulators of improved construction and with improved operating features. These subtracting accumulators are provided with so-called balance printing selection devices incorporated in the accumulators themselves for determining whether the accumulator is to control printing during total taking operations or not.

Another object of the invention is to provide a tabulating machine of the adding and subtracting type in which specific improvements and novel arrangements and construction of parts are introduced with a view to extending the scope of accounting problems which may be performed by the machine.

More specifically, the improved arrangement permits the selection of an entire accumulator as a unit to perform either adding operations or subtracting operations under control of perforations in a selected card field and to suppress control of the accumulator from certain record cards. This is effected by a simplified plugboard arrangement whereby a single plug connection will condition the accumulator to add and a single plug connection will condition the accumulator to subtract while the absence of controlling plug connections will render the accumulator incapable of receiving entries.

Another object of the invention is to provide improved selecting mechanism for selectively determining the manner in which data in a particular card field is to control the accumulator. Control perforations in the well known "X" index point position of columns of the record cards have heretofore been utilized to determine whether an accumulator is to add or subtract. In the present machine, so-called selective "X" control mechanism is provided whereby the entry of data from a record card having more than one "X" control perforation may be controlled by a selected one of such perforations to the exclusion of control by the other and such other perforation will control only when the first is absent.

A further object of the invention is to provide improved automatic controlling mechanism which is generally provided in such machines and may be of the so-called major and minor control type wherein upon a change in minor group classification, the machine performs minor total taking operations and upon major group classification the machine performs major total taking operations. In previous machines, major group classification changes have initiated successive minor and major total taking operations identified by the successive printing of the minor and major totals. Other machines have been arranged for concurrent minor and major total taking operations identified by the concurrent total printing of minor and major totals.

The present machine has for another of its objects the incorporation of selective devices whereby the machine may be readily adjusted to perform either successive or concurrent minor and major total taking operations in accordance with the will of the operator.

Various other objects and advantages of the invention will be obvious from the following particular description of the mechanism embodying the invention or from an inspection of the accompanying drawings; and the invention also constitutes certain new and novel features of construction and combination of parts hereinafter set forth and claimed.

In the drawings:

Fig. 4 is a sectional view of a subtracting accumulator. The section is taken substantially along the lines 4—4 of Fig. 1.

Fig. 5 is a detail of the units order of an accumulator, showing the mechanism for entering the elusive one.

Fig. 6 is a detail of the carry bail operating mechanism.

Fig. 20 is an isometric view of one denominational order of a subtracting accumulator.

Fig. 21 is a detail of certain of the parts shown in Fig. 20.

Figure 29A:
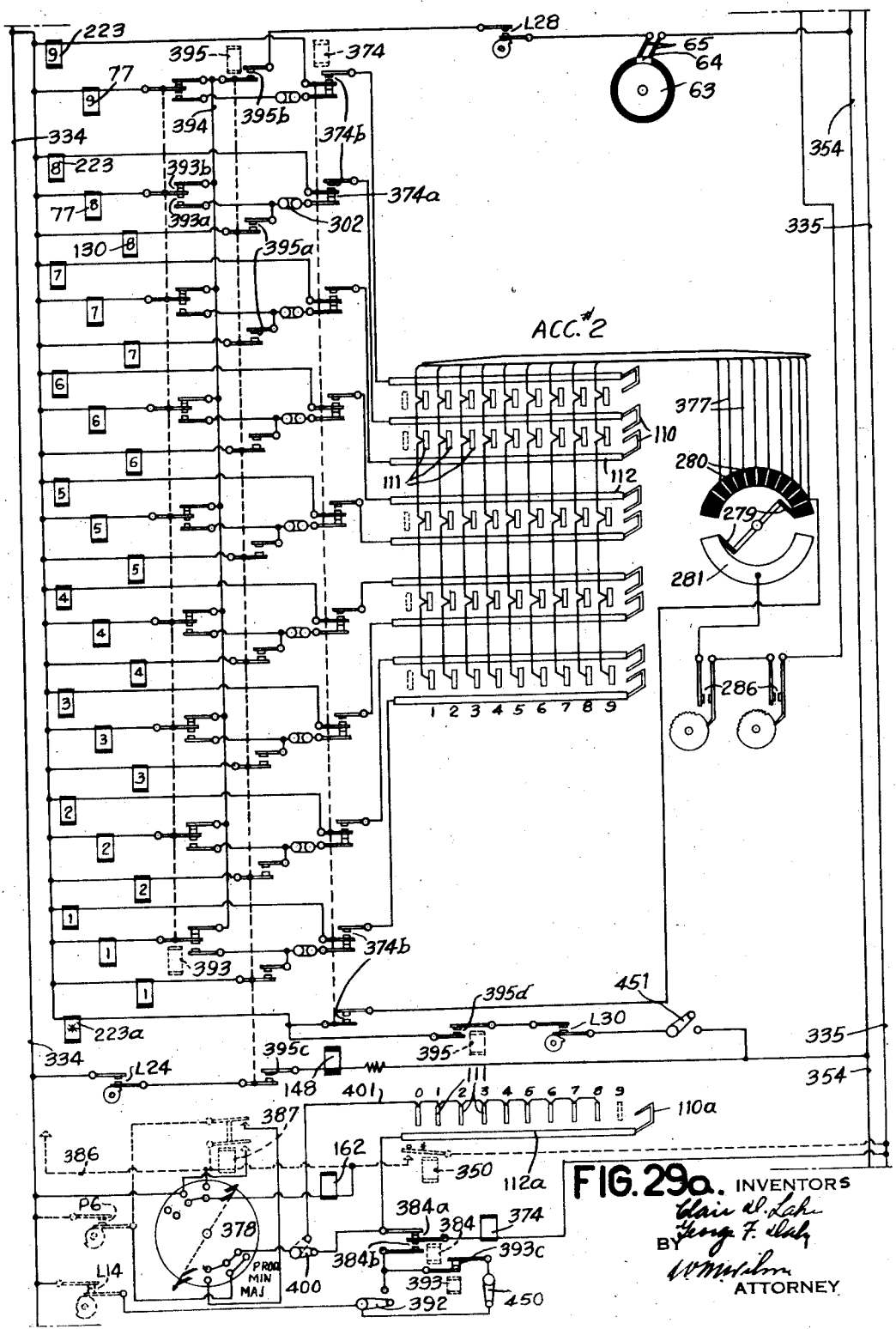
Figure 29B:
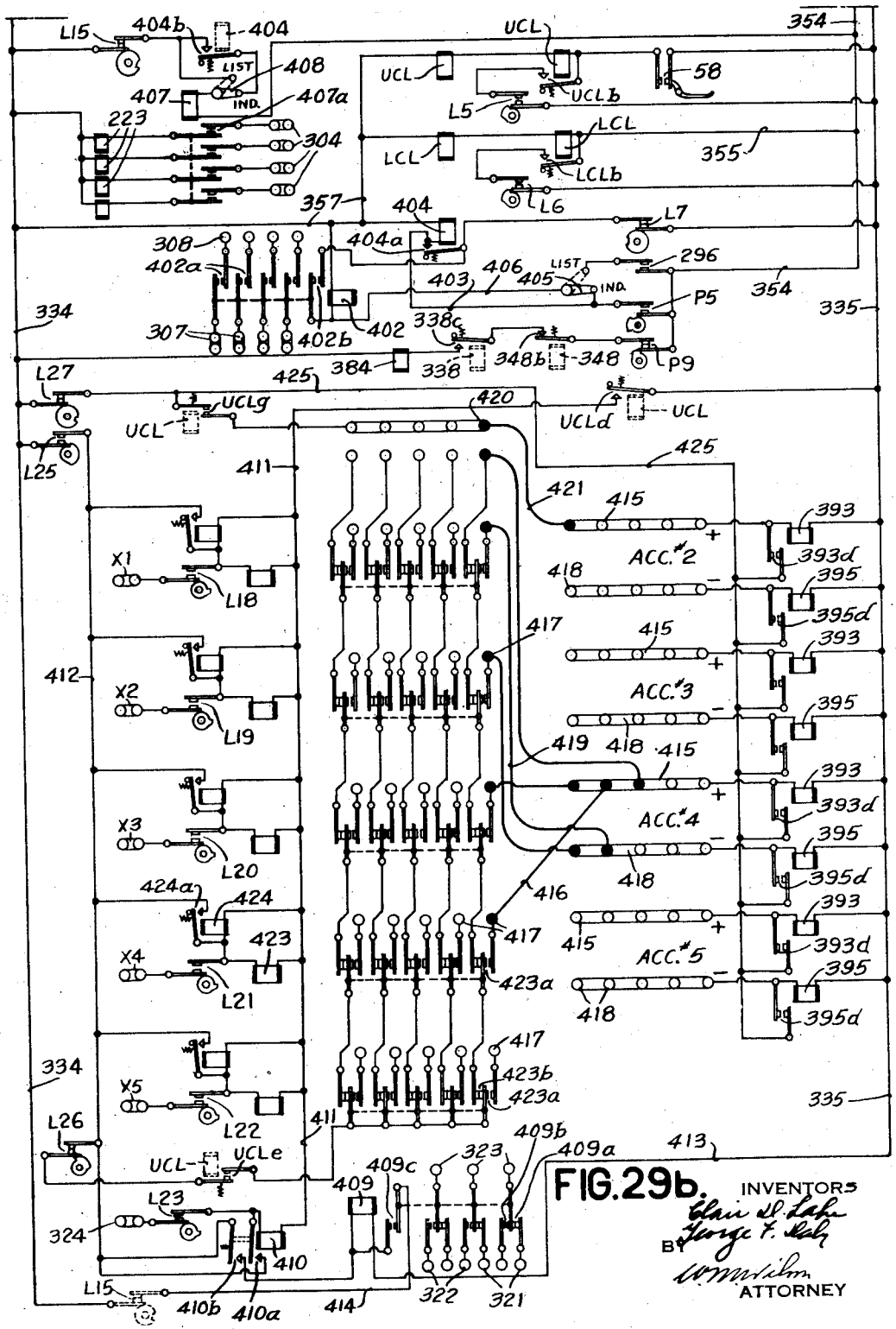

Figs. 29, 29a and 29b, placed one above the other in the order named, constitute a wiring diagram of the electric circuits of the machine.

Figure 30:
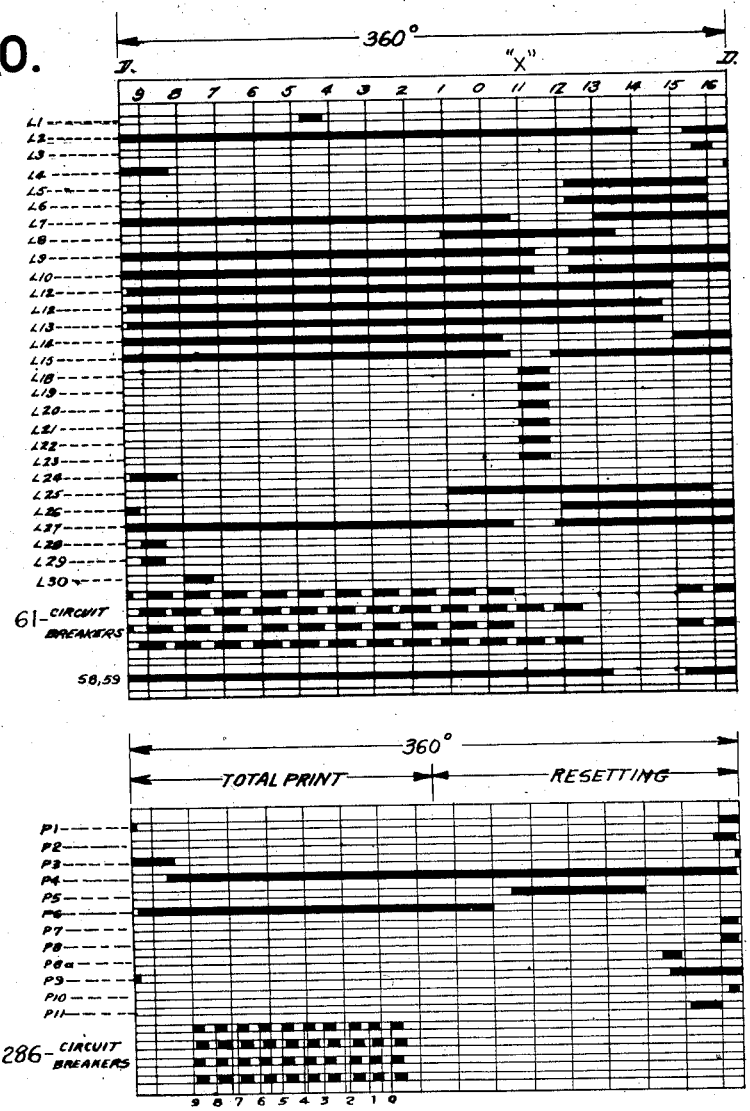

Fig. 30 is a timing chart of the circuit controlling contacts of the machine.

Figure 31:
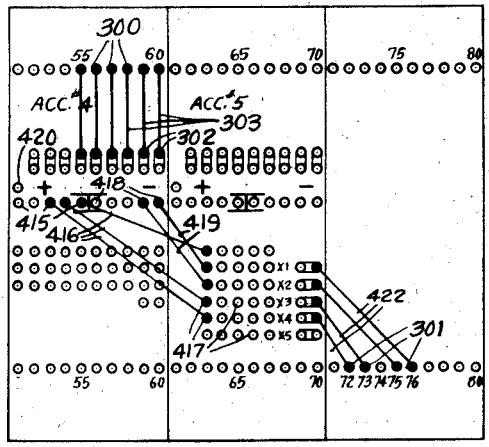

Fig. 31 is a section of the plugboard showing an example of plug connections made for a particular problem.

Figure 32:
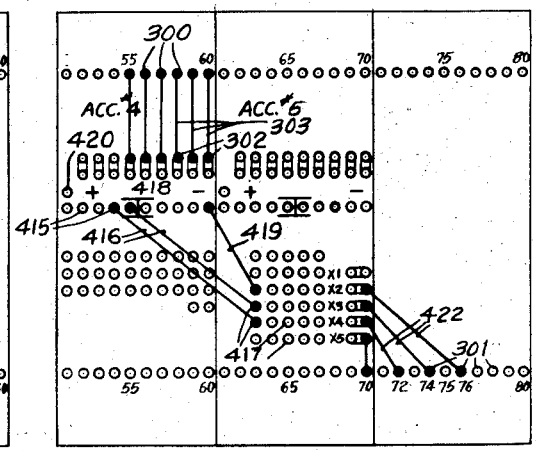
Figure 33:
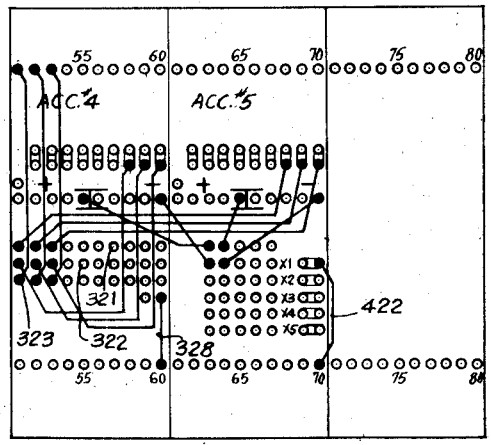
Figure 34:
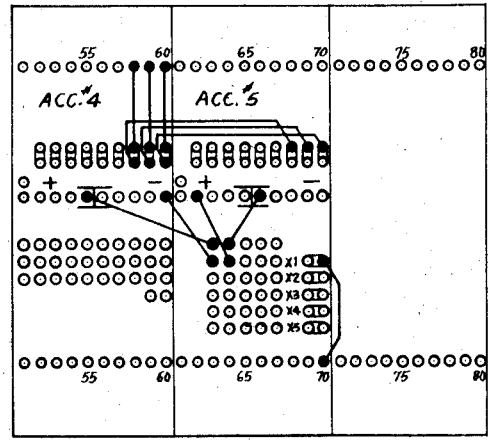

Figs. 32, 33 and 34 are details of a section of the plugboard, illustrating plugging connections for various types of problems.

Figure 35:
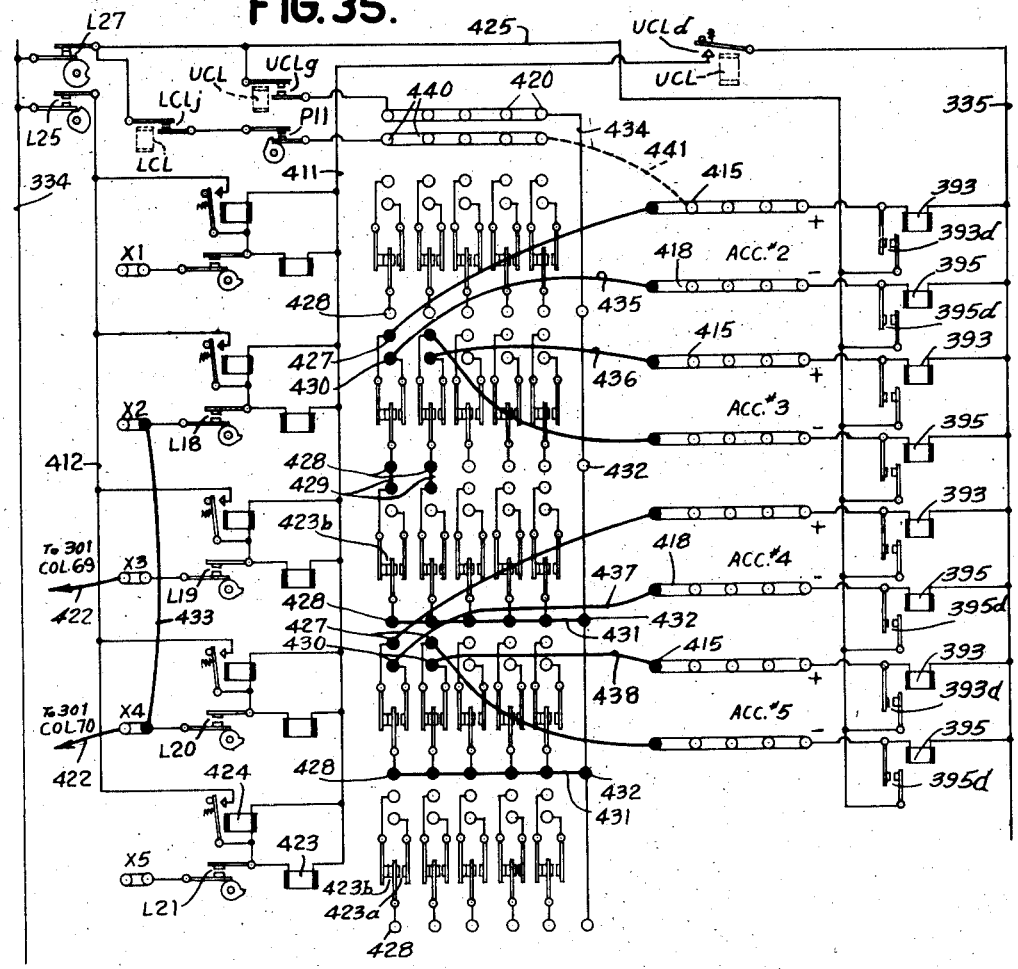

Fig. 35 is a section of the circuit diagram arranged in accordance with a modified form of the invention.

Figure 35A:
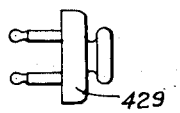
Figure 35B:
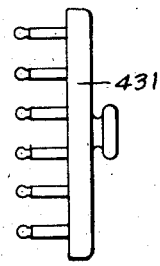

Figs. 35a and 35b are details of selective multiple pronged plug connectors.

Figure 36:
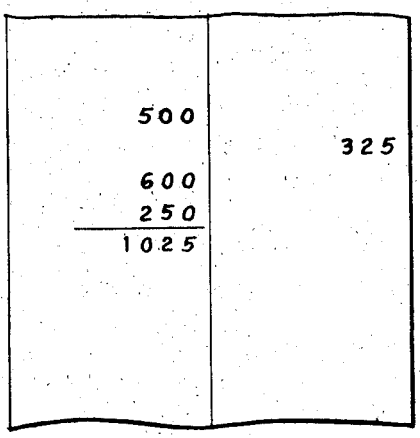
Figure 37:
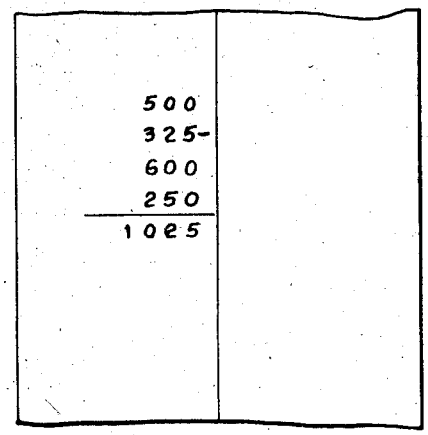

Figs. 36 and 37 are portions of a record prepared by the machine; and

Figure 38:
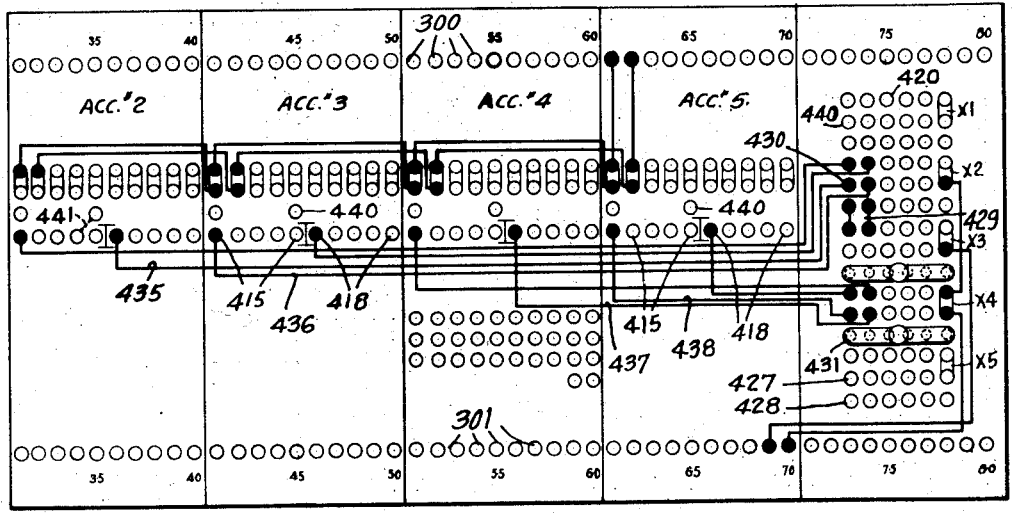

Fig. 38 is a detail of a section of the plugboard arranged in accordance with the modified form of the invention.

General description

The separate units of the machine will first be described in detail and their mechanical operation explained. Following this, the circuit diagram will be explained and the complete operation of the entire machine set forth.

Figure 1:
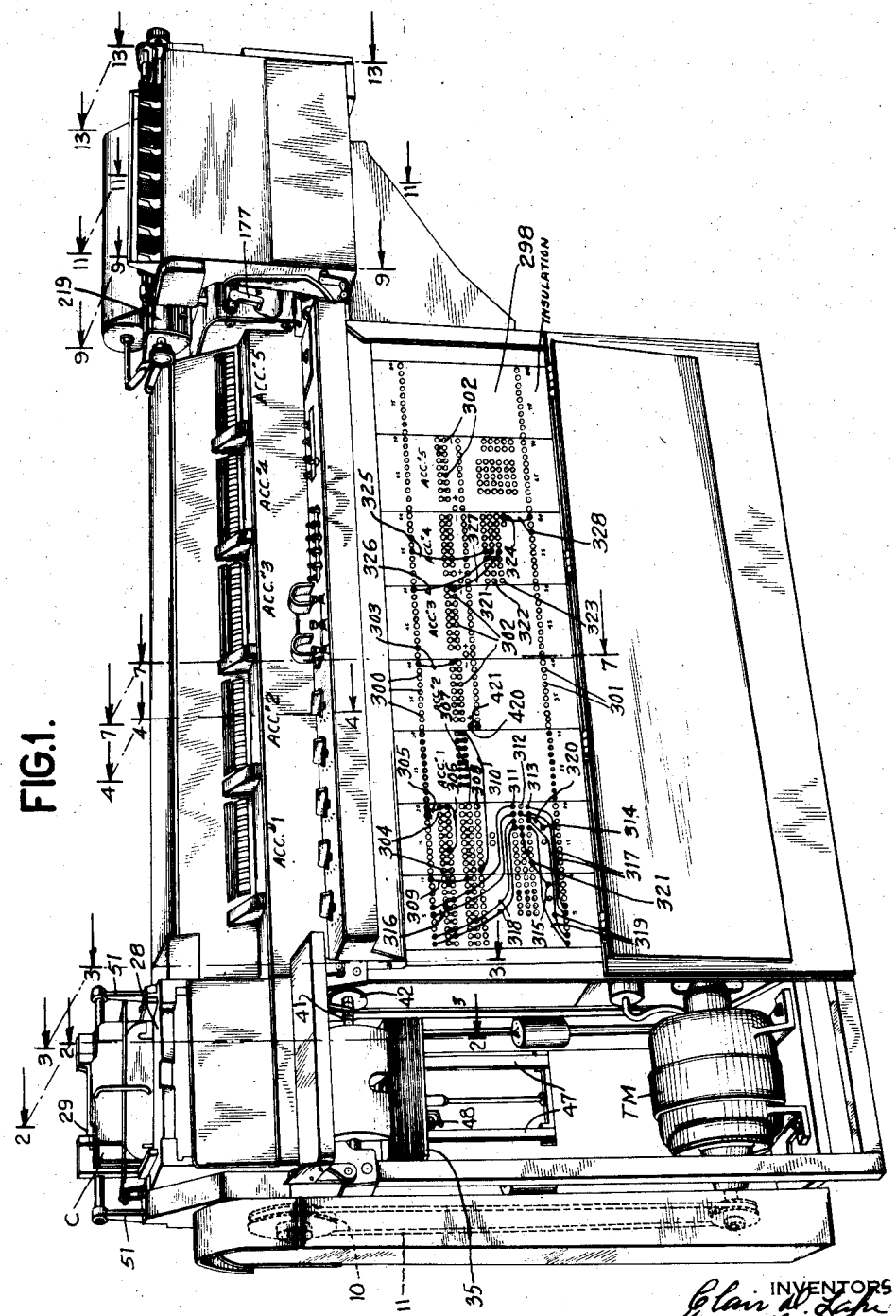
Fig. 1 is a perspective view of the complete tabulating machine.

Referring to Fig. 1, the machine comprises, generally, a card feeding and analyzing section at the left end thereof, which feeds the record cards to the analyzing devices where they are sensed by the analyzing mechanism. The accumulating mechanism is located in the center of the machine and comprises five accumulators. The printing mechanism is located at the right end of the machine and comprises seven so-called banks of printing type bars. Below the accumulators is the plugboard of the machine, by means of which the various units may be coordinated to produce the desired result in the form of a printed record. The tabulating motor, indicated at TM, serves to drive the card feeding devices, the accumulators, and the printing mechanism through suitable controlling mechanism, which will be described hereinafter.

Driving clutch connection

Figure 2:
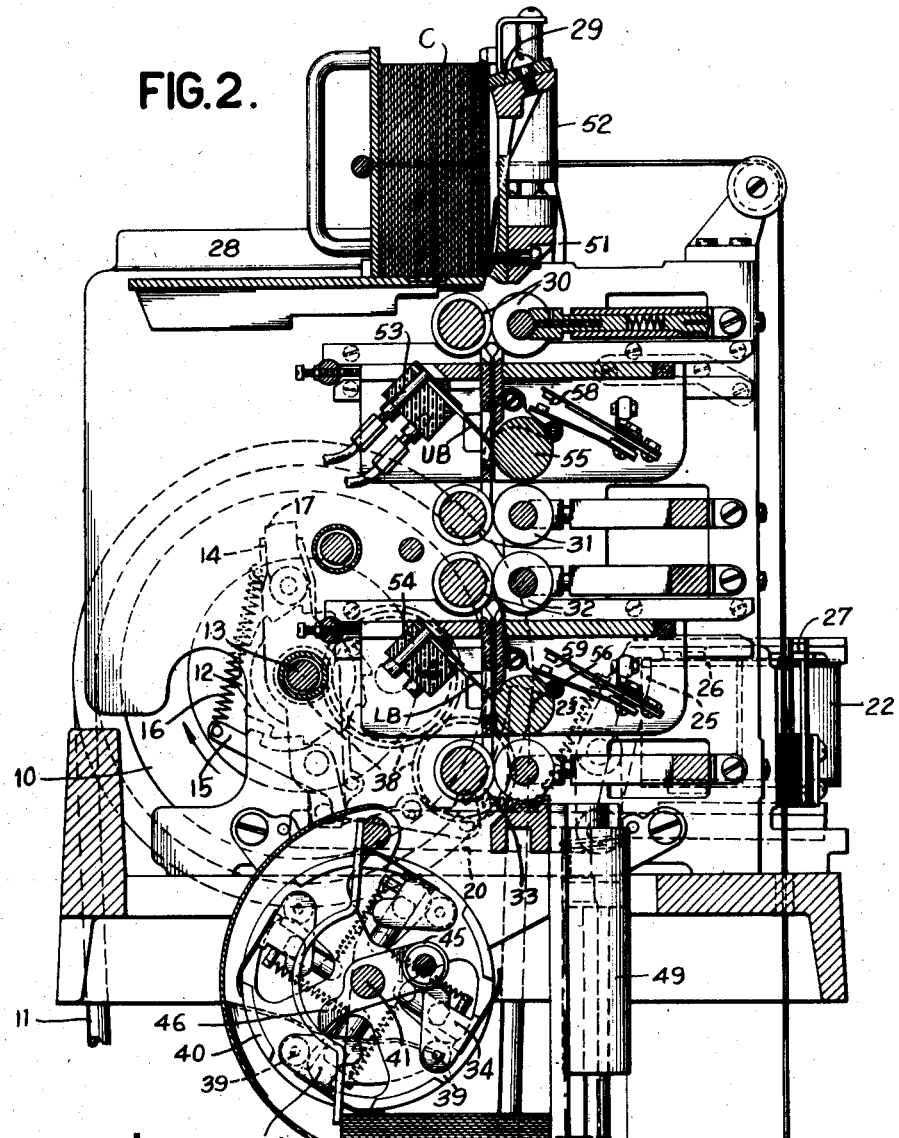
Fig. 2 is a central section of the card feeding and analyzing mechanism. The section is taken substantially along the lines 2—2 of Fig. 1.
Figure 23:
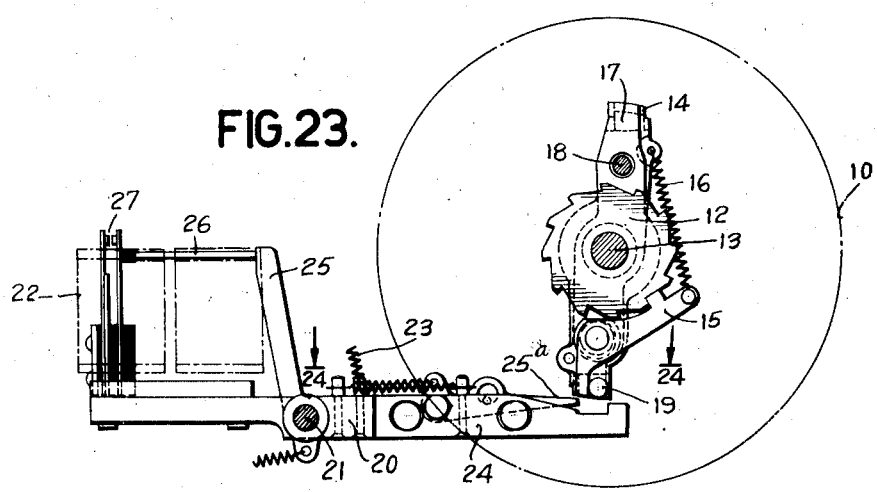
Fig. 23 is a detail of the main clutch of the machine.

When the motor TM is in operation, it drives a pulley 10 through a belt connection 11 (see also Fig. 2). Secured to the pulley is a clutch driving element 12 (see also Fig. 23) through which the motor is connected to the various mechanisms. Pulley 10 and element 12 are loosely mounted upon a shaft 13 to which is secured a member 14, which carries a clutch dog 15 urged by a spring 16 into engagement with the teeth of the driving element. The member 14 also carries an arm 17 which is slightly rotatable with respect to member 14 and limited in its movement by pin 18 secured in member 14 and passing through a slightly larger opening in arm 17. The supporting stud of dog 15 passes through a similar opening in arm 17 and its shorter arm engages a pin 19 in the arm 17 and through the action of spring 16 tends to turn arm 17 in a counterclockwise direction with respect to member 14. Member 14 and arm 17 are double-ended for half revolution operation; that is, either extremity may cooperate with the clutch arm 20. The arm 20 is pivoted at 21 and actuated by magnet 22 to permit clutching action. When the magnet is deenergized, the parts are in the relative positions shown in dotted outline in Fig. 2, where a spring 23 serves to hold the parts in such relationship.

Figure 24:
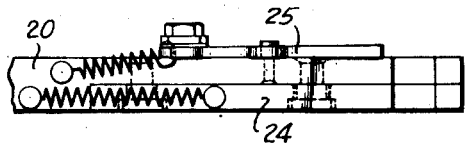
Fig. 24 is a detail section taken along lines 24—24 of Fig. 23.

Upon energization of magnet 22, arm 20 will be rocked in a clockwise direction (as viewed in Fig. 23) and arm 17 and member 14 will be released, thus permitting dog 15 to rock into engagement with element 12 to be driven thereby until magnet 22 is deenergized, at which time the hooked end of arm 20 will be rocked into the path of member 14 and the hooked end of a slider 24, which is resiliently carried by arm 20 (see also Fig. 24) will rock therewith into the path of arm 17. Slider 24 will engage arm 17 and through pin 19 disengage dog 15 from the clutch element 12 before arm 20 engages member 14. At the same time, spring-pressed member 25a will snap into position behind member 14 to prevent backward rotation, thus holding member 14 and its connected shaft 13 positively in home position. Integral with arm 20 is an upstanding arm 25, which, through a rod 26, is adapted to close a pair of contacts 27 when the parts are in the position of Fig. 2 and to permit opening of the contacts when the parts are in the position of Fig. 23, where magnet 22 is energized.

Card feeding mechanism

The cards C are placed in the feed hopper of the machine (Figs. 1, 2 and 3), which is indicated generally at 28, from which they are fed downwardly, one by one, by picker 29 so that the leading edge is moved into cooperation with a pair of feed rollers 30 and thence downwardly in succession past pairs of feed rollers 31, 32 and 33 to a stacker mechanism whose spring-pressed clips 34 grip the leading edge of the card and deposit it upon tray 35. The rollers 30, 31 and 32 carry pinions 36 (Fig. 3) at the outer ends of their supporting shafts, which are driven from shaft 13 through the train of gears, generally designated 37 in Fig. 3. The lowermost pair of rollers 33 is similarly driven by gearing, generally designated in dotted outline at 38 in Fig. 2. Thus it will be seen that the feeding rollers are in operation continuously, as long as shaft 13 is in operation and come to rest when the shaft is disconnected from the driving pulley.

Figure 3:
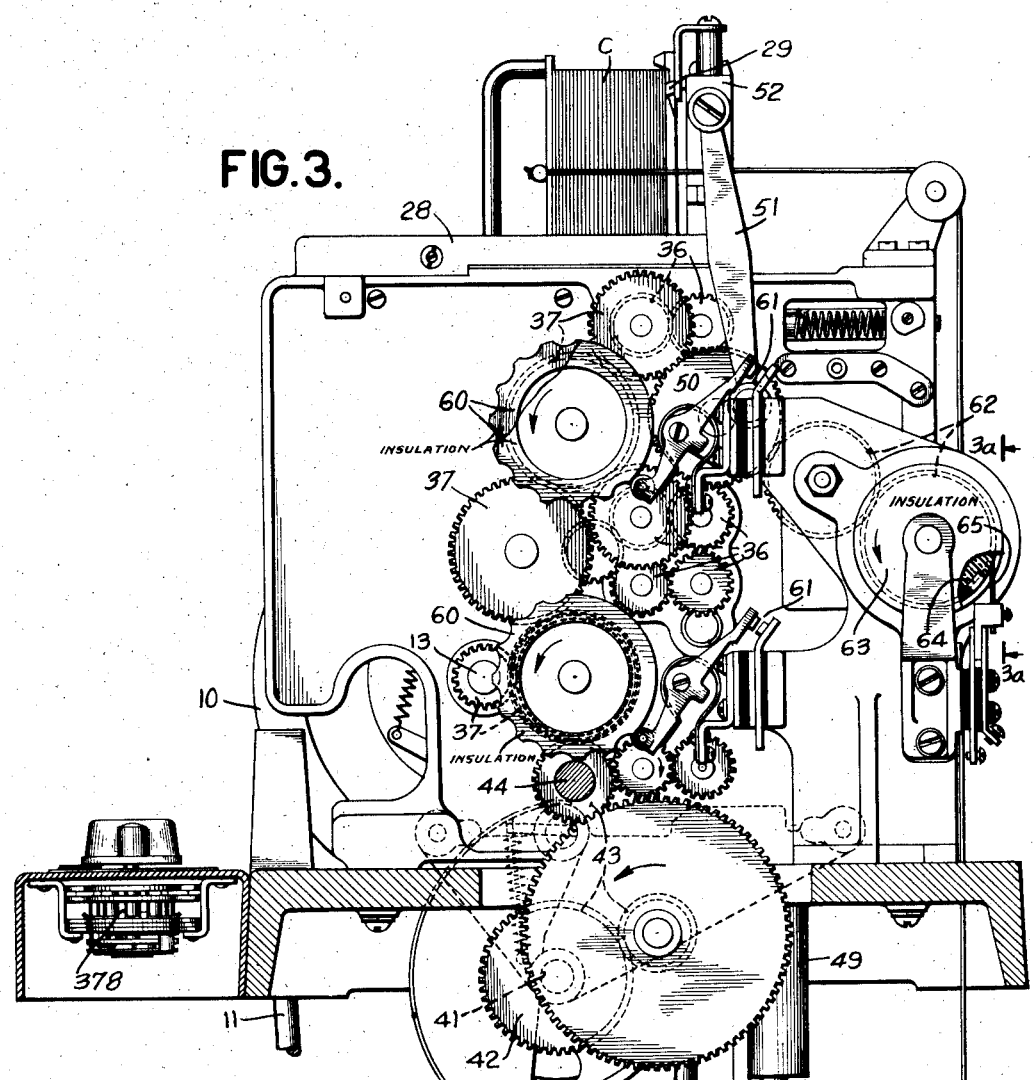
Fig. 3 is an outside elevation of the driving connections for the card feeding mechanism. The section is taken substantially along the lines 3—3 of Fig. 1.

*Stacker*.—The stacker clips 34 are pivoted at 39 to the stacker drum 40 which is supported upon shaft 41. In Fig. 3, the shaft 41 carries a gear 42 which is driven by gearing, generally designated 43, from the shaft 13. One of the gears 43 is secured to a shaft 44 which extends through the accumulating devices and serves to drive the accumulating and printing devices. The ratio of the gearing to the stacker is such that the clips 34 are successively brought into position to receive the successively fed cards. As the clips pass through the receiving position, they engage a stationary roller 45 which rocks them in a clockwise direction about their pivots 39 so that the advancing card may be received in the opening thus provided. As the clips continue with the card, they are again engaged by a stationary cam element 46 which again rocks them in a clockwise direction to release the card, permitting it to rest on the tray 35. The tray is supported for vertical movement on guides 47 and urged upwardly by a spring 48. A dash pot and plunger, generally designated 49, are provided to control the free upward movement of the tray after the cards have been removed therefrom.

Connected to a gear 50 (Fig. 3) which is driven from train of gears 37 is a link 51, whose upper end is pivoted to the cross-head 52 upon which is mounted the picker 29. The cross-head 52 is guided for vertical movement and is adapted to reciprocate once for each revolution of gear 50. The gearing 37, 50 and the link 51 are duplicated on the other side of the card feed section for parallel operation of the cross-head.

Card analyzing mechanism

Between pairs of feed rollers 30 and 31 are located the upper analyzing brushes UB and between rollers 32 and 33 are located lower analyzing brushes LB. The brushes UB and LB are mounted in insulating blocks 53 and 54, respectively, and cooperate with contact rollers 55 and 56 respectively.

Figure 2A:
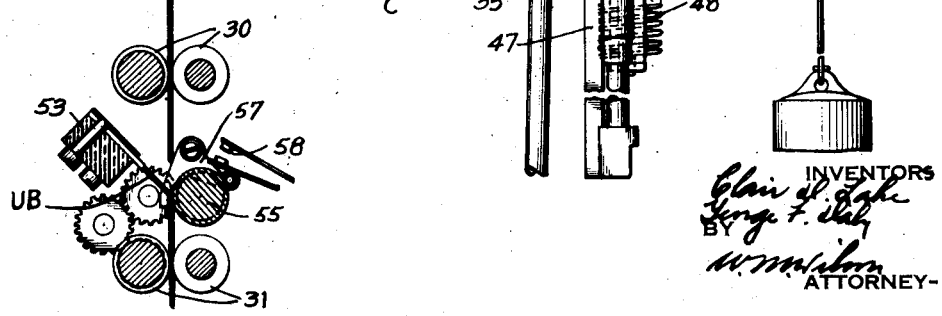
Fig. 2a is a detail of the card lever contact operating device.

The roller 55 is geared to roller 31, as indicated in Fig. 2a. At each of the brush stations is a pivoted card lever 57, the upper of which cooperates with a pair of contacts 58 and the lower of which cooperates with a pair of contacts 59. The levers serve to close their respective contacts while the record card is passing the brushes and permit the contacts to open during the interval between cards. The general operation of the card feeding and analyzing mechanism, in terms of cycles of operation of the machine, is as follows: (A cycle is represented by one reciprocation of the picker 29 or two and a half revolutions of shaft 13.)

With the machine at rest, the picker 29 is in the position indicated in Fig. 2 and during the first cycle, the picker will move upwardly to a position above the card C and then move downwardly to advance the leading card to the feed rollers 30 which advance it to the upper brushes UB. At the end of the first cycle, the leading edge of the card will have slightly passed the upper brushes UB, insulating them from the contact roller 55 and the picker 29 will again be in the position of Fig. 2. During the second cycle, the card will be advanced by the rollers to an exactly similar position with respect to the lower brushes LB; that is, its leading edge will be slightly past the lower brushes LB, insulating them from the contact roller 56. Meanwhile, during this second cycle, a second card will have been advanced to the upper brushes so that there is now a card under the upper brushes and a card under the lower brushes. During the third cycle, the cards will pass the lower and upper brushes concurrently and corresponding index point positions will be analyzed concurrently by the two sets of brushes. At the end of the third cycle, the first card will have been advanced to a position where its leading edge has entered the open jaws of one of the clips 34 and during a fourth cycle, the clips will grip the card and bring it into position upon the discharge stack or tray 35.

The distance between the trailing edge of the first card and the leading edge of the next card is greater than the contacting edge of the card levers (actually ¾ of an inch) so that the card levers will rock in and out between the cards.

Figure 3A:
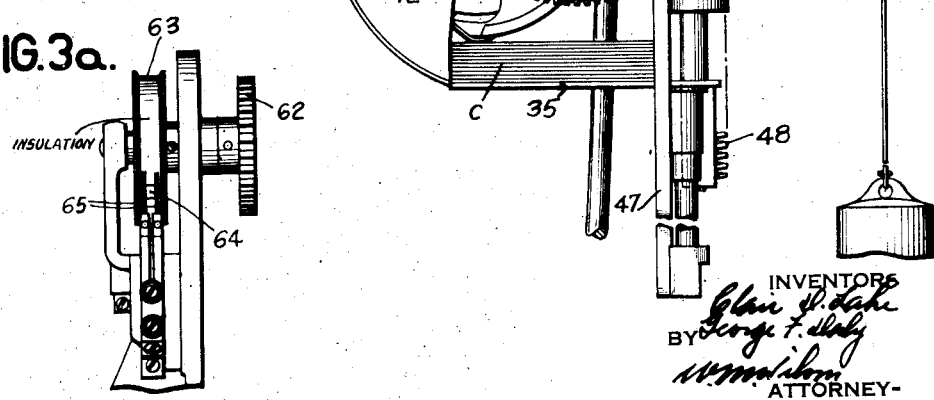
Fig. 3a is a detail of a commutator device. The section is taken along the lines 3a—3a of Fig. 3.

*Circuit breakers*.—In Fig. 3 are shown the card feed circuit breaking devices, which control the making and breaking of the current on the feed roller 56 of the lower brushes between the index point positions of the record card as it is analyzed. These circuit breaking devices comprise cams 60 of insulating material, provided with a number of camming portions for cooperation with the pivoted arms of pairs of contacts 61. The function of these circuit breakers will be more clearly explained in connection with the circuit diagram. Driven from gear 50 (Fig. 3) through pair of gears 62 (see also Fig. 3a) is a commutator 63, having a conducting segment 64 which cooperates with a pair of brushes 65. This commutator is known as the "9" impulse emitter and its function will also be explained in connection with the circuit diagram.

Adding mechanism

The machine is provided with five accumulators, indicated in Fig. 1 as ACC#1—5. Accumulator #1 is adapted for adding operations only and the other four accumulators are capable of either adding or subtracting. In Fig. 4 is shown a central section of one of the subtracting accumulators and the entering mechanism for additively entering items into this accumulator will now be described.

The same entering mechanism is provided in each of the other accumulators and the description of one of them will therefore suffice for the remainder.

Figure 19:
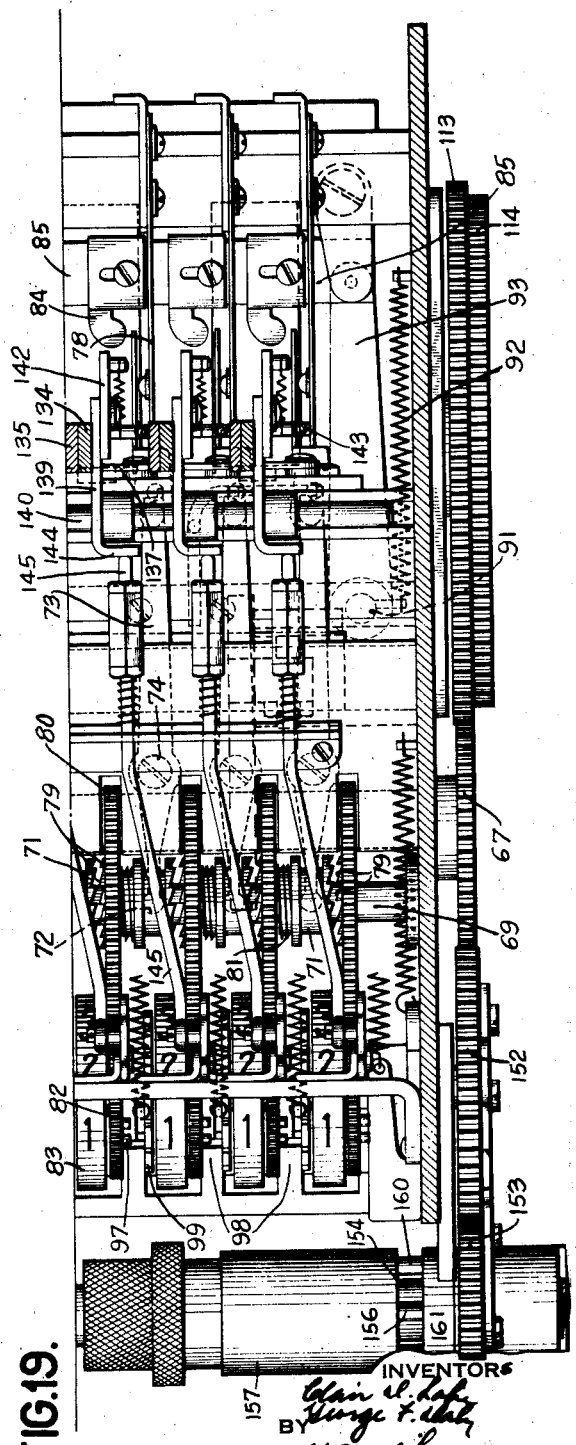
Fig. 19 is a plan section taken substantially along the lines 19—19 of Fig. 4.
Figure 22:
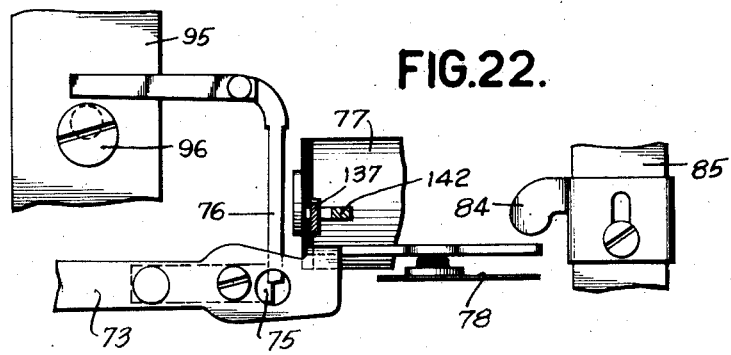
Fig. 22 is a further detail of parts shown in Fig. 20.
Figure 25:
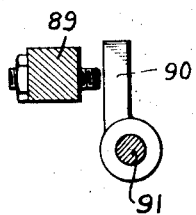
Fig. 25 is a detail of certain parts associated with the accumulator.

The accumulator drive shaft 44, as explained above, is in operation as long as the tabulating clutch is in operation so that as long as cards are feeding shaft 44 is in rotation. For each of the accumulators there is a gear 66 (Fig. 7) secured to shafts 44, which drives a gear 67 secured upon a shaft 68. The ratio is such that shaft 68 makes one complete revolution for each cycle of the machine; that is, for each card analyzed, shaft 68 makes one revolution. Referring again to Fig. 4, shaft 68 drives clutch shaft 69 through a pair of gears 70. Shaft 69 has slidably mounted thereon, but keyed for rotation therewith, a number of clutch elements 71, there being one for each denominational order position of the accumulator (see also Fig. 19). The member 71 is provided with a groove in which fits the end of an arm 72 of a lever 73 which is pivoted at 74. The lever 73 is provided with a block 75 normally held in position (as shown in Figs. 20 and 22) by armature 76 of a magnet 77. A leaf spring 78 bears against the extremity of lever 73 and moves the same upon release of block 75 by armature 76. This movement will bring clutching member 71 into engagement with cooperating teeth 79 integral with a gear 80 loosely mounted on shaft 69. An additional coil spring 81 is provided to assist in moving member 71 into driving engagement with teeth 79. Gear 80, when thus coupled to shaft 69, will rotate a gear 82 which meshes therewith and displace the accumulator index wheel 83. The rearward extremity of arm 73 is adapted to be engaged by a finger 84 carried on a bar 85 toward the end of the cycle for the purpose of disengaging clutch element 71 from teeth 79 and relatching block 75 on armature 76. The operation of bar 85 is controlled from a cam 86 carried by shaft 68 (Fig. 7) which rocks a follower arm 87 pivoted at 88 and having a depending arm 89 (see also Fig. 25). The counterclockwise movement of arm 89 will cause an adjustable stud therein to engage a horizontal arm 90 secured to a rod 91 and rock the latter in a clockwise direction (as viewed in Fig. 19) against the tension of its spring 92. Rod 91 has also integral therewith an arm 93 which connects with bar 85 and moves the same downwardly (as viewed in Figs. 19 and 22) to actuate arm 73.

Briefly summarizing the adding operation, the magnet 77 may be energized at various points in the cycle of the machine, depending upon the location of a perforation in a column of a record card analyzed by the lower brushes LB. This energization may take place in response to a perforation in any of the index point positions from 9 to 1 inclusive. A perforation in the 9 position will trip the clutch element 71 nine steps before finger 84 is operated to de-clutch it and a perforation in the 1 position will trip the clutch element 71 one step before it is de-clutched by finger 84. Each step of clutching engagement corresponds to a tenth of a revolution of the accumulator index wheel 83 so that a 9 hole will move it nine-tenths of a revolution and a 1 hole will move it one-tenth of a revolution. The manner in which circuits through the lower brushes LB control the operation of magnet 77 will be set forth in connection with the explanation of the circuit diagram.

The magnet armatures 76 are also positively restored toward the end of the cycle by a face cam 94 carried by gear 70 which engages a sliding plate 95 to move the same upwardly (as viewed in Fig. 22) whereby eccentric studs 96 thereon will engage extensions of armatures 76 and rock the latter away from their magnets 77.

Each gear 82 (Figs. 4, 18, 19 and 20) is provided with a number of pins 97 which cooperate with fingers 98 to prevent over-throw of the wheels 83 upon release of the clutching elements.

Figure 16:
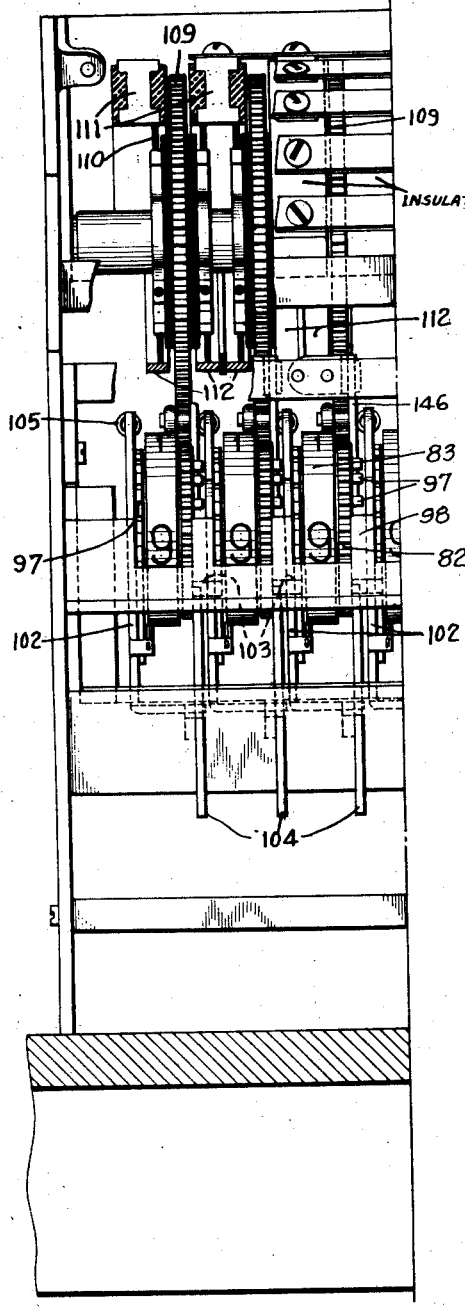
Fig. 16 is a view taken along the lines 16—16 of Fig. 4 with the cover removed and showing several orders of the subtracting accumulator.
Figure 17:
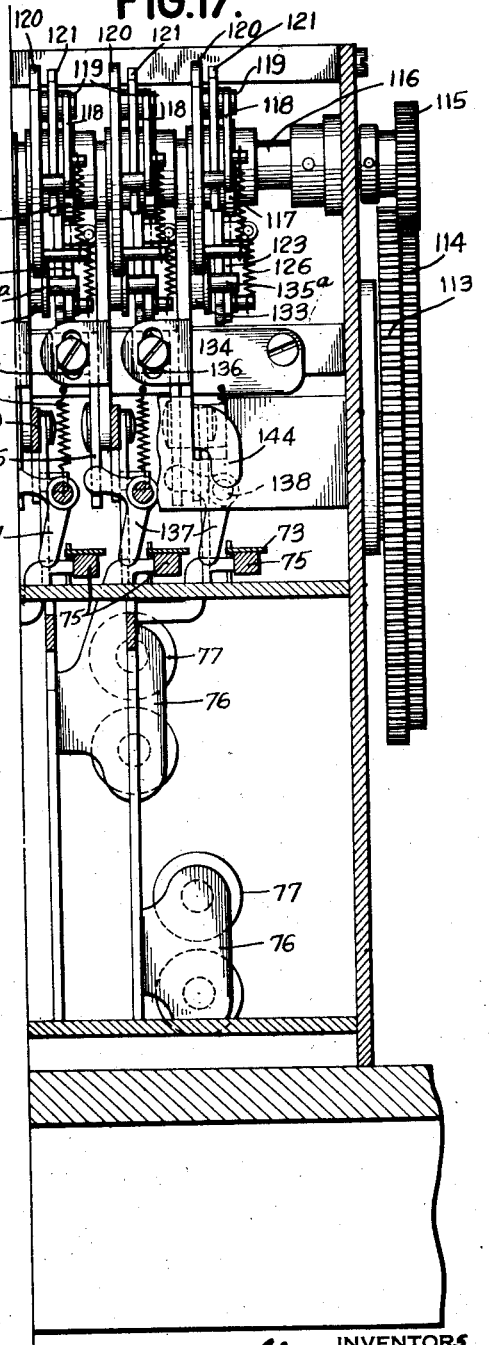
Fig. 17 is a section taken substantially along the lines 17—17 of Fig. 4, showing further details of the subtracting accumulator.
Figure 18:
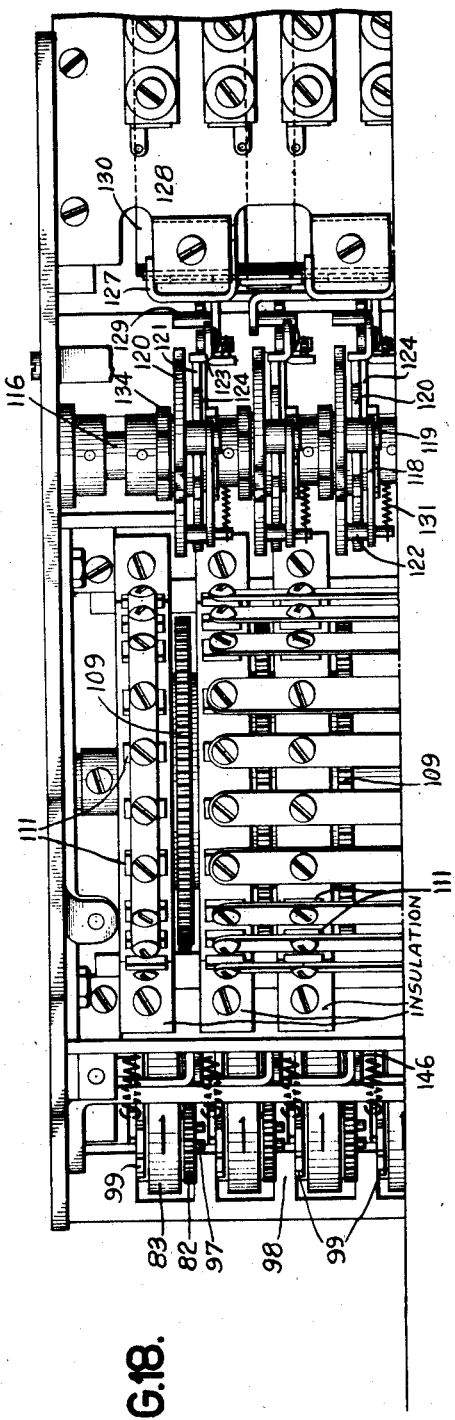
Fig. 18 is a plan view of one end of a subtracting accumulator.

*Carry mechanism.*—Each wheel 83 has associated therewith a carry cam 99 (Figs. 4 and 5) which cooperates with a pawl 100 pivoted at 101 to an arm 102 (see also Fig. 16). When the wheel 83 passes through zero position, a high tooth of carry cam 99 will engage and rock its pawl 100, which through an extension 103 thereon will rock a spring-pressed latch 104 downwardly. This latch normally serves to hold the member 102 of the next higher order in the position shown in Fig. 4.

Release of the member 102 in this manner will permit a spring 105, connected at its upper end, to rock the same in a clockwise direction and permit its pawl to engage the next adjacent tooth on its cam 99. This tripping action takes place during entering portions of the cycle at which time the carrying bail 106 is in a position shown in Fig. 5. After the entering portion of the cycle, a cam 107 on shaft 68 (see Fig. 6) will rock a pivoted bell crank 108, which has link connection to bail 106, so that the bail will be rocked back to the position of Fig. 4, carrying with it arms 102 which have been tripped by the carry cams of the next lower orders and will thus enter an extra one in the proper denominational orders. Bail 106 (Fig. 6) is provided with a camming projection 106a, which is adapted to cooperate with one end of the detenting member 98. Under control of cam 107 on shaft 68, the projection 106a will hold detenting member 98 out of cooperation with the pins 97 during the entering portion of the cycle and will also hold it out of engagement with the pins during the carrying portion of the cycle. At other times, the member 98 is permitted to move into engagement with the pins.

*Read-out mechanism.*—Also driven by gear 80 (Figs. 4 and 20) is a gear 109 which is displaced in the same manner as index wheel 82. Since the ratio of gears 109 and 82 is two to one, the former will turn through half a revolution for each revolution of the latter. Carried by and insulated from gear 109 is a pair of electrically connected brushes 110, one of which cooperates successively with ten conducting segments 111 while the other cooperates with an arcuate conducting strip 112. The relationship of the parts is such that when the index wheel 83 is in its zero position, one of the brushes 110 is in contact with the zero segment 111 and the other brush is in contact with the strip 112, thus forming an electrical connection between the two.

If the wheel 83 is displaced to indicate say 8, then one of the brushes 110 will be in contact with "8" segment 111 and the other brush will be in contact with the strip 112. The positioning of the brushes 110 provides a convenient electrical read-out mechanism for controlling total printing operations and the electrical circuits involved in these operations will be more fully explained in connection with the circuit diagram.

The operation of the accumulator thus far described is the same for all five accumulators, additive entries being made in all of them in the same manner and the total printing read-out commutators being differentially set in the same manner.

Subtracting mechanism

The following description pertains only to accumulators #2 to #5 which are provided with the subtracting mechanism about to be described, although, if desired, accumulator #1 may be similarly arranged. Subtracting in the present machine is of the type known in the art as direct subtraction; that is, it is distinguishable from tabulators in which the amount to be entered is first converted into its complement by so-called translators and then this complement additively entered by the regular adding mechanism. In the operation of the present subtracting counter, the entry of the nine complement of a number to be subtracted is effected by initially tripping all the adding magnets 77 as though to add nines in each position and causing the perforation in the record card to de-clutch the adding mechanism in accordance with the location of the perforation. This will result in the addition of the nine complement of the number. The elusive one is added into the units order of the accumulator independently to thereby change the nine complement to a ten complement. For example, if an 8 is to be subtracted in a particular order, the related adding magnet 77 is tripped at the 9 position in the cycle of the machine and the index wheel will commence to rotate.

At the next index point position, which is 8, the perforation will, through the mechanism to be presently described, cause de-clutching of the mechanism after the index wheel 83 has turned through one step with the result that a one is added into the index wheel representative of the nine complement of 8. The mechanism for effecting this de-clutching action will now be described.

Figure 7:
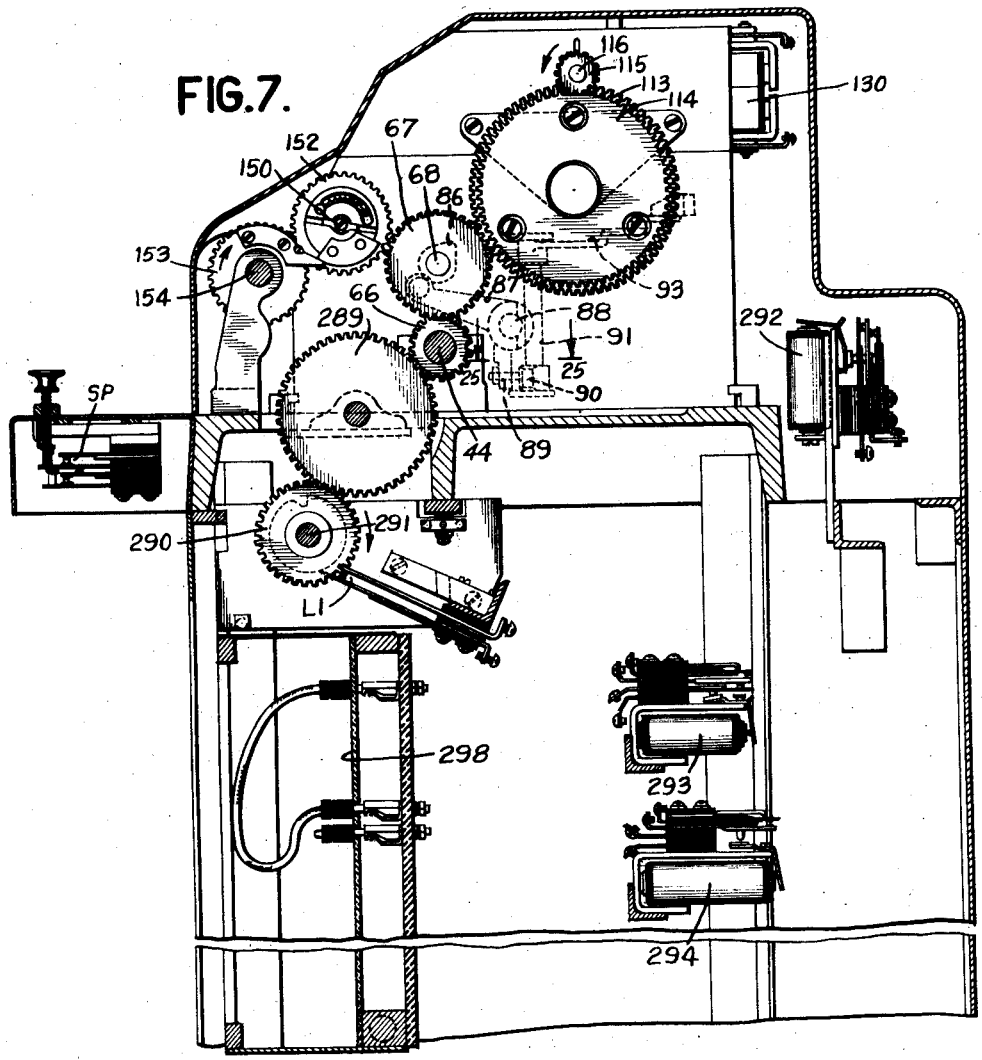
Fig. 7 is a sectional view taken along the lines 7—7 of Fig. 1, showing the exterior of the subtracting accumulator.

*Actuating mechanism.*—In Fig. 7 a gear 67 drives an idler 113 which is integral with an idler 114 having driving connection with a pinion 115 secured upon a shaft 116, the ratio being such that shaft 116 makes two revolutions for one revolution of shaft 69. Secured to shaft 116 are a plurality of clutch elements 117, one for each denominational order position of the accumulator and cooperating with each element is a clutching dog 118 pivoted at 119 to a cam 120 freely mounted on shaft 116. Also freely mounted on the shaft is a triple-armed member 121, one of whose arms engages a pin 122 in the free end of dog 118 to hold the latter out of engagement with the driving element 117. Each of the arms of member 121 is adapted to cooperate in turn with a pawl 123 which is carried by clutch element 124 which is pivoted at 125. The pawl 123 is resiliently mounted on element 124 through spring and pin connection 126. A magnet armature 127 pivoted at 128 and having a pin 129 in a laterally extending arm thereof is adapted, upon energization of subtracting magnet 130, to rock element 124 in a clockwise direction (as viewed in Fig. 20) to release member 121 thereby permitting spring 131 to rock the element in a counterclockwise direction through pin 122 and at the same time permit the engagement of dog 118 with the driving element 117. The cam 120 will thus be driven in a counterclockwise direction until the next arm of member 121 is engaged by pawl 123, which then causes disengagement of the clutch and interruption of further movement of the cam. The cam 120 is provided with three notches 132 about its periphery, into which a roller 133 rises successively.

Upon the initial movement of cam 120, the higher, concentric portion of cam 120 will depress roller 133 and with it slider 134 upon which the roller is pivoted. A pin 135a extending axially from roller 133, engages a horizontal arm of element 124 to cause the positive restoration of clutching pawl 123 and armature 127 immediately after the clutching action. Slider 134 (see also Fig. 21) has adjustably connected thereto a slider 135 which is vertically positionable with respect to slider 134, as by pin and slot connection 136. The lower extremity of slider 135 is provided with a notch into which the horizontal arm of a bell crank 137 is fitted. The bell crank is pivoted at 138 and its depending arm lies adjacent to an edge of the clutch arm 73 so that the downward movement of slider 135 will cause the bell crank 137 to engage and move arm 73 in a de-clutching direction at a time determined by the time of energization of magnet 130 which is controlled by circuits extending through the lower brushes.

It is desirable at the time of de-clutching of the adding mechanism to cause the positive restoration of the armature 76 of magnet 77 which ordinarily would not be positively restored until the end of the cycle. This is effected through an arm 139 pivoted at 140 and having connection with the slider 134 through a stud 141. Arm 139 carries a spring-pressed pivoted finger 142 whose downwardly extending portion is adapted to engage the armature 76 and move it away from its magnet 77. A spring 143 is provided to move arm 139 and incidentally slider 134 upwardly after they have been depressed. Arm 139 is also provided with an offset finger 144 which engages a horizontally slidable rod 145 whose opposite end is connected through a pin to a finger 146 pivoted at 147. The free end of finger 146 lies in the path of pins 97 and the finger will be moved into cooperation with one of the pins 97 at the time that de-clutching is effected, as just described. This will prevent overthrowing of the index wheel 83 which might otherwise take place due to the high speed at which this mechanism is operated.

*Elusive one.*—The mechanism by means of which the elusive one is entered into the accumulator is illustrated in Fig. 5. The units order of each of the four subtracting accumulators has associated therewith a magnet 148 whose armature 149 is secured to the carry lever latch 104 of the units order so that energization of magnet 148 will trip the units pawl carrying arm 102, whereby, during the carrying portion of the machine cycle, the pawl 100 associated with the units order will advance the units wheel one step. It is to be noted that the clutching member 117 is provided with seven teeth and the adding clutch member 71 is provided with fourteen teeth and since the gear ratio between the two is two to one, it will be apparent that one tooth of member 117 will pass through clutching position with respect to its clutching dog for each tooth on the clutching member 71 passing a tooth 79 on its driven element.

Accumulator resetting mechanism

Figure 8:
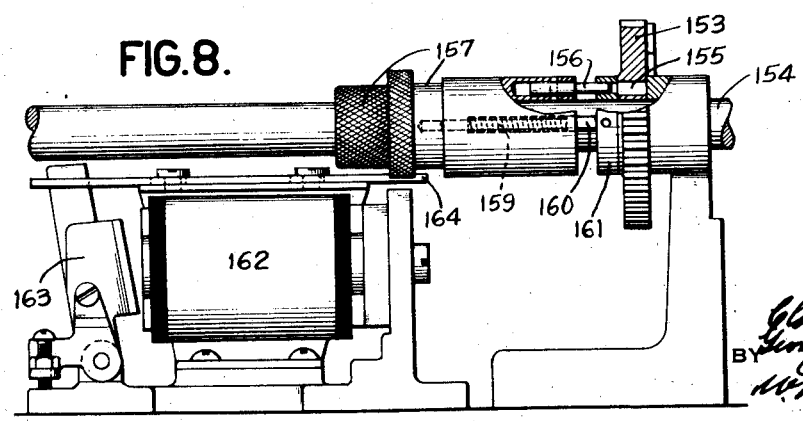
Fig. 8 is a detail of the selective resetting mechanism for the accumulators.

Resetting of each accumulator is effected in the following manner: The shaft 150 (Fig. 4) upon which the index wheels 83 of an accumulator are losely mounted is slotted for cooperation with spring-pressed pawls 151, pivoted upon and carried by the individual index wheels. The shaft 150 carries a gear 152 (Fig. 7) at its extremity which is in engagement with a gear 153 freely mounted upon reset shaft 154. There are, accordingly, five sets of gears 152, 153, there being one for each of the five accumulators. The gears 153 may be selectively coupled to the resetting shaft for resetting of the accumulator so that shaft 150 is rotated one complete revolution during which the slot therein will pick up the pawls 151, which may be variously displaced, depending upon the setting of the index wheel and will bring them all to zero position. In Fig. 8, gear 153 is shown as being provided with an opening 155 adapted to receive a plunger 156 carried by a clutching sleeve 157. The pin 156 passes through an opening in a collar 161, which is fixedly secured to the reset shaft 154 so that the sleeve 157 in which pin 156 is mounted will continually rotate with the shaft. A spring 159 housed within sleeve 157 urges a plunger 160 against the collar 161 and tends to hold plunger 156 out of engagement with opening 155 in gear 153.

A magnet 162, upon energization, will rock its armature 163 in a clockwise direction and move a slider 164 toward the right. The slider has connection with sleeve 157 and will move the latter in the same direction to cause coupling action between shaft 154 and gear 153. This coupling action takes place before shaft 154 commences to turn and magnet 162 will necessarily remain energized during the rotation of the shaft to maintain the coupling connection throughout the revolution.

Printing mechanism

Figure 9:
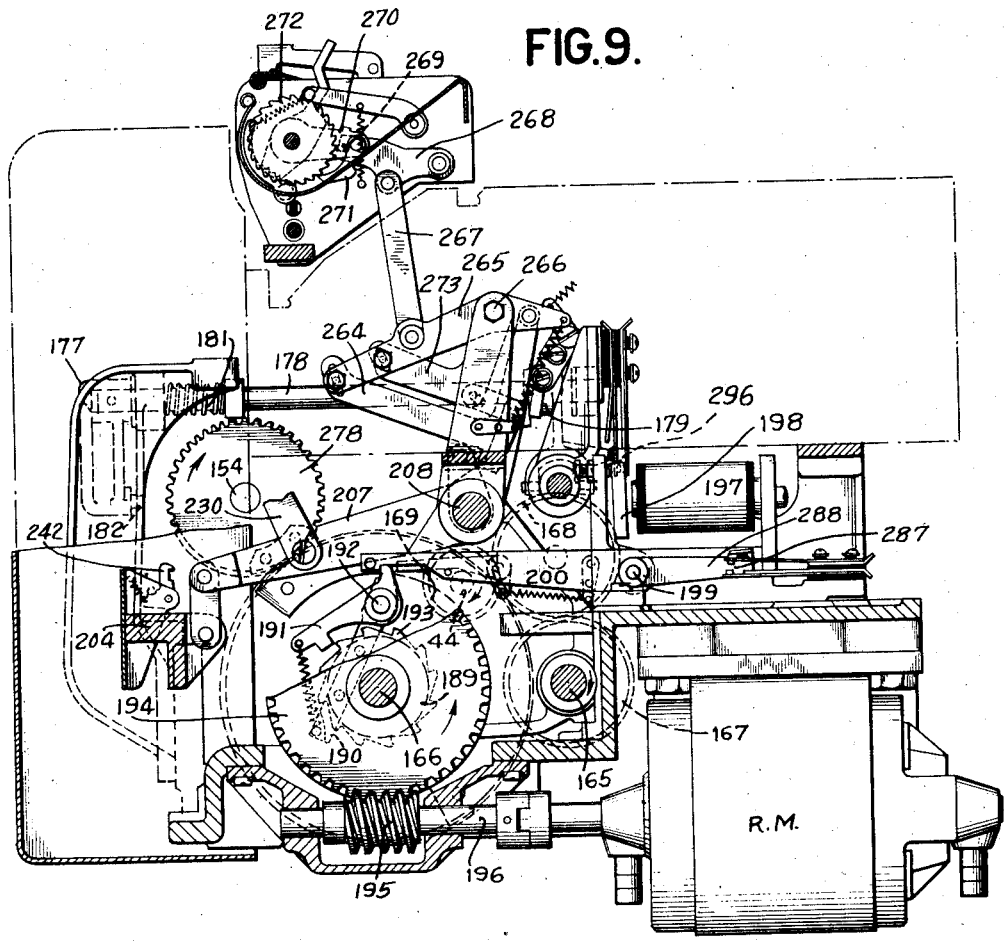
Fig. 9 is a section taken substantially along the lines 9—9 of Fig. 1, showing the resetting motor and the associated mechanism.
Figure 10:
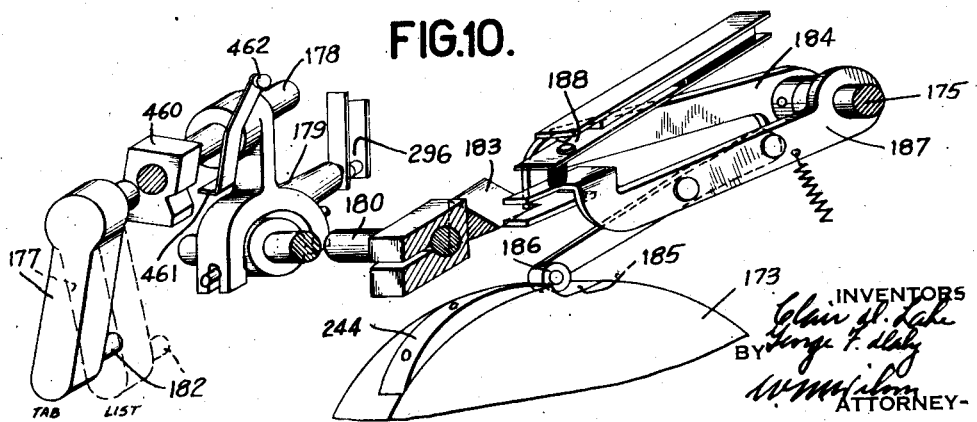
Fig. 10 is a detail of a contact operating device.
Figure 11:
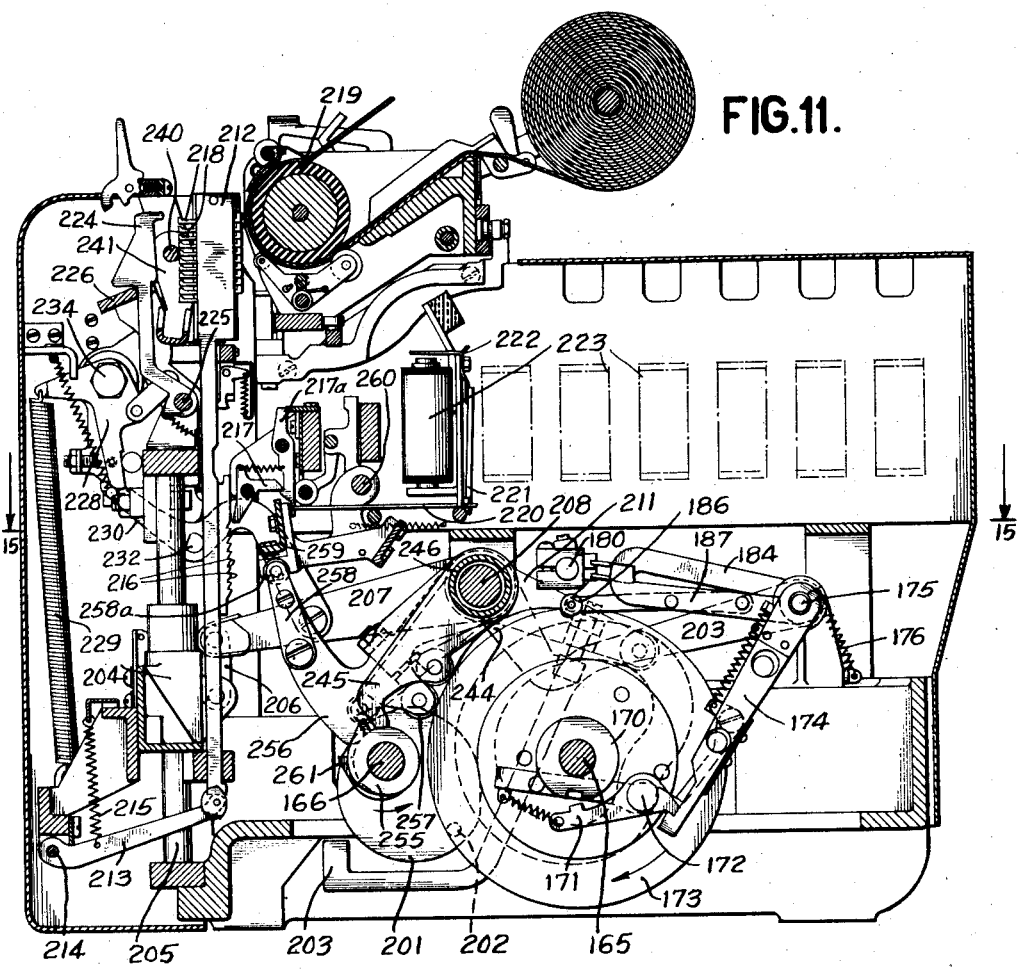
Fig. 11 is a central section of the printing mechanism. The section is taken substantially along the lines 11—11 of Fig. 1.
Figure 15:
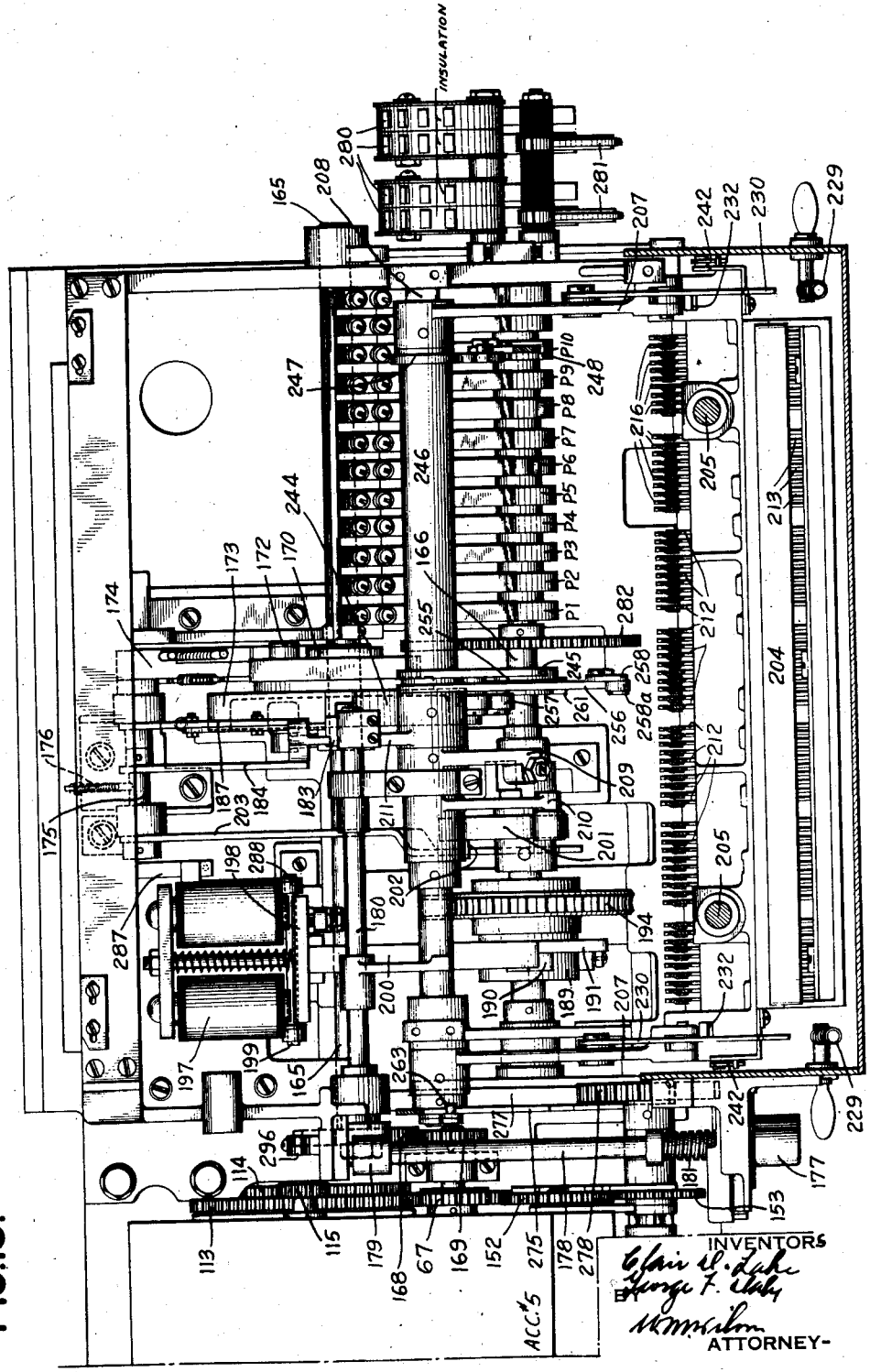
Fig. 15 is a section taken along the lines 15—15 of Fig. 11, showing the arrangement of the mechanism associated with the printing devices.

*Listing.*—The printing mechanism is shown in sectional elevation in Fig. 11. The listing shaft 165 drives this mechanism during listing operations and the totaling shaft 166 drives it during total taking operations. In Figs. 9 and 15, the listing shaft 165 is shown as having a gear 167 secured to one extremity thereof, which, through an idler 168, meshes with a gear 169 secured to the extremity of the accumulator drive shaft 44. As pointed out above, the drive shaft 44 rotates during the operation of the card feeding mechanism and therefore the listing shaft 165, which is geared directly thereto, will also operate during card feeding operations only. Secured to shaft 165 (Fig. 11) is a clutch driving element 170 with which a spring-pressed clutching dog 171 is adapted to cooperate. The dog is pivoted at 172 to the listing box cam 173 which rotates with the shaft 165 only when the dog 171 is in engagement with driving element 170. The dog is normally held in the position shown in Fig. 11 by a clutch operating arm 174 mounted upon a shaft 175 which is normally biased in a clockwise direction by a spring 176. When the machine is conditioned for listing operations, that is, when it is desired to operate the printing mechanism for each card fed through the card feeding mechanism, the clutch arm 174 is rocked out of engagement with the dog 171 and maintained in such disengaging position. This disengagement is effected as follows:

In Figs. 1, 9, 10 and 15, a finger piece 177 is positioned as shown in Fig. 1 and in full lines in Fig. 10 when the machine is positioned for tabulating operations and moves to the dotted line position indicated in Fig. 10 when the machine is set for listing operations. Finger 177 is secured to the end of a rod 178, whose opposite end carries a fork 179 which straddles and has pin and slot connection with a rod 180 suitably mounted for axial reciprocation. Shifting of finger piece 177 from its full line position to its dotted line position in Fig. 10 will shift rod 180 toward the right. Before such shifting is effected, finger piece 177 and rod 178 are moved toward the left (as viewed in Fig. 9) against the action of a spring 181, thereby removing a pin 182 in the free end of finger 177 from a detenting opening in the frame of the machine. After rocking of the finger piece is effected, the pin 182 will enter a second opening to hold the finger piece in its moved position. In Fig. 10, the fork 179, when in the position for tabulating, as shown, is adapted to close a pair of contacts 296 whose function will be explained in connection with the circuit diagram. Rod 180 carries at its opposite end a camming member 183 whose lower inclined surface engages the end of an arm 184 which is pinned to the shaft 175, and causes the latter to turn in a counterclockwise direction. With rod 180 moved to the right and held in such position, it is obvious that shaft 175 will be held in its moved position and consequently clutch arm 174 secured thereto will be held out of engagement with the clutch dog 171, permitting the latter to engage in the notch in the driving element 170 and remain so engaged so that the listing cam 173 will rotate in synchronism with the card feeding mechanism, making one revolution for each record card fed and analyzed. The listing cam 173 is provided with a notch 185 in its periphery in which a roller 186 carried by a spring-pressed arm 187 freely mounted on shaft 175 engages. The cooperation of roller 186 with notch 185 is for the purpose of preventing inadvertent movement of the listing cam 173 when it is not connected to the shaft 165.

From an inspection of Fig. 10, it will be apparent that the upper inclined surface of member 183 will engage the free end of arm 187 to rock it in a clockwise direction and raise roller 186 out of engagement with cam 173 and hold it out of engagement throughout listing operations, and permit the cam to be continuously clutched to the listing shaft 165. Incidentally, the clockwise rocking of arm 187 will cause closure of a pair of contacts 188 whose function will be explained in connection with the description of the circuit diagram. The total shaft 166 (Fig. 9) has secured thereto a member 189 which is integral with a block 190 to which a clutching dog 191 is pivoted at 192. A clutch driving element 193 is secured to a worm wheel 194 which meshes with a worm 195 on the armature shaft 196 of the motor RM, which is known as the reset motor and which operates for total taking and reset operations only.

Figure 14:
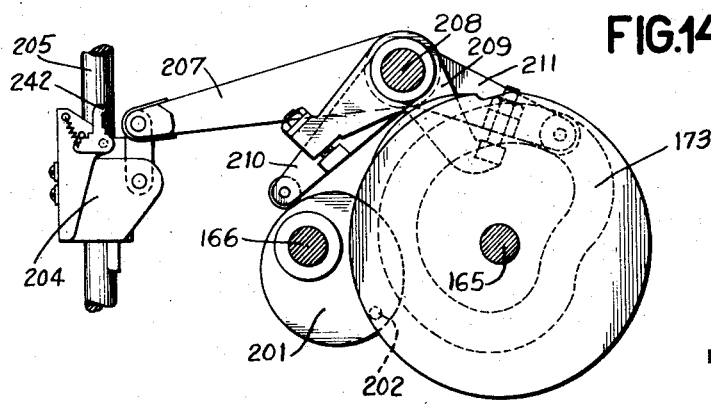
Fig. 14 is a detail of the operating cams of the printing mechanism.

Clutching of dog 191 to the driving element 193 is effected under control of a magnet 197, which, upon energization, attracts its armature 198 pivoted at 199 to rock the clutching arm 200 clockwise, thereby releasing dog 191 for engagement with driving element 193. Shaft 166 carries a cam 201 (Figs. 11 and 14) which operates the printing mechanism during total taking operations.

*First card listing.*—The machine is so arranged that shafts 165 and 166 are incapable of concurrent operation and mechanism is provided for causing a single revolution of cam 173 to follow each revolution of shaft 166. It may here be pointed out that under certain conditions shaft 166 makes but a single revolution during total taking operations. As will be explained hereinafter, when the machine is conditioned for so-called successive resetting, the shaft 166 makes two revolutions during major total taking operations and the single revolution of cam 173 will follow the second revolution of shaft 166 under such conditions.

Pin 202, carried by cam 201, is adapted to engage the free end of an arm 203 which is secured to shaft 175 to rock the shaft in a counterclockwise direction and release clutching dog 171 for engagement with driving element 170. This action is effective to permit so-called first card indication; that is, permit listing data directly from the first card of each group which is being tabulated, when the machine is set for tabulating operations. Under such conditions, the finger 177 is in its full line position (as shown in Fig. 10) and clutching dog 171 is normally held out of engagement with its driving element. Since the rocking of arm 203 by pin 202 is momentary, the shaft 175 will return to its latching position and cam 173 will come to rest after a single revolution, which is concurrent with the analysis by the lower brushes of the first card of a new group passing through the card feeding and analyzing section.

The printing cross-head 204 is mounted for vertical reciprocation on guide rods 205 (Fig. 11) and is connected by links 206 to arms 207, which are secured upon a shaft 208. Shaft 208 has secured thereto (see Fig. 14) a double-arm member 209, one arm of which cooperates with a follower arm 210 actuated by cam 201 and the other arm cooperates with a cam follower 211 actuated by a cam groove in the listing cam 173. By virtue of this construction, it is apparent that the shaft 208 may be rocked under control of either of the cams at a rate determined by the contour of such cams.

*Type bar action.*—Slidably mounted in cross-head 204 are type bars 212, which are suitably guided for vertical reciprocation. Their lower ends about the free ends of arms 213 pivoted at 214 to the cross-head 204 and held in the position shown in Fig. 11 by springs 215. Thus, upward movement of cross-head 204 will be accompanied by movement in the same direction of type bars 212 under the influence of springs 215. The type bars are provided with a plurality of ratchet teeth 216, which cooperate with stopping pawls 217 so that the type bars may be interrupted at various positions to present any of their type elements 218 to the printing platen 219 for cooperation therewith.

By virtue of the spring connection 215, the bars 212 may be interrupted without interfering with the upward movement of the cross-head which has an invariable extent of reciprocation controlled by the cams 201 and 173. The stopping pawl 217 is normally held in inoperative position by a spring-pressed pivoted latch 217a, whose lower end is connected by a rod 220 to a bell crank member 221 which is pivoted at 222 and one of whose arms constitutes the armature of a printing magnet 223. Energization of magnet 223 will rock bell crank member 221 in a counterclockwise direction, drawing rod 220 toward the right to unlatch pawl 217 so that it may swing into engagement with teeth 216 and interrupt the further upward movement of the type bar 212. The energization of magnet 223 is controlled by the lower brushes LB, which, upon sensing the perforation in the record card C, will complete the circuit to the magnet 223 and, due to the synchronization of the type bar travel with the passage of the card by the brushes, will present the type element 218, corresponding to the controlling perforation, in printing position.

*Printing hammers.*—Associated with each type bar 212 is a spring-pressed printing hammer 224 pivoted at 225. The hammer normally rests against an operating bail 226 also pivoted at 225. The bail is connected by a link 227 to a tripping member 228 biased in a counterclockwise direction by a spring 229 (see also Fig. 27). The extremity of one arm of member 228 is in latching cooperation with an arm 230 pivoted at 231 to the cross-head operating lever 207. As the arm 207 is rocked in a clockwise direction to elevate the cross-head and type bars 212, the pivot 231 is moved upwardly therewith, causing member 228 to be rocked in a clockwise direction against the action of spring 229 and rock bail 226 in a counterclockwise direction through the link 227. As the lever 207 reaches the upper extremity of its movement, a pin 232, carried by arm 230, will engage a fixed stud 233, which will then act as a pivot for the arm 230 so that further upward movement of connection 231 will cause counterclockwise rocking of arm 230 with stud 233 as a pivot, causing the arm to release member 228.

Figure 12:
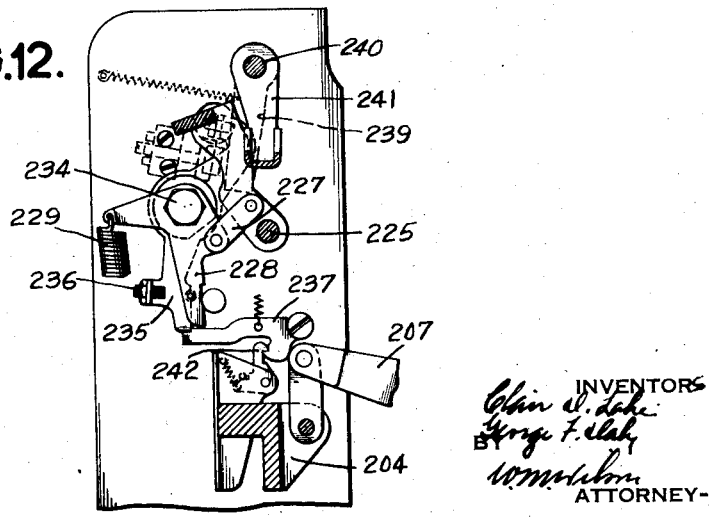
Fig. 12 is a detail of the printing hammer tripping and restoring mechanism.

The spring 229 will thereupon rock the member 228 rapidly in a counterclockwise direction, forcing bail 226 against the hammers 224 so that the latter will strike the type elements 218 which are in printing position to effect printing therefrom. Pivoted at 234 (see also Figs. 12 and 13) is a member 235 carrying a stud 236 engageable by the member 228 so that as the member 228 is rocked by arm 230, stud 236 will be engaged and member 235 will be rocked in the same direction from the position shown in Figs. 11 and 13 to the position shown in Fig. 12 where a spring-pressed latch 237 engages the lower extremity of member 235 and holds it in the position shown during the return movement of the member 228. Member 235 is provided with an adjustable stud 238 at its upper end which projects through a suitable opening in the side plate of the printing section and engages a spring-pressed arm 239 carried by a rod 240. Rod 240 supports a bail 241 which lies between the type hammers 224 and the type bars 212. The cross-head 204 carries a spring-pressed latch 242 at its upper extremity which, when the cross-head is in its uppermost position, will engage latch 237 (as shown in Fig. 12) so that at the commencement of the downward or return movement of the cross-head, latch 242 will rock latch 237 about its pivot to release member 235. With member 235 released, spring 243 will rock arm 239 and bail 241 rapidly in a clockwise direction to strike hammers 224 and restore them, if they are not already in restored position. This mechanism provides for rapid restoration of the type hammers 224 and insures their movement out of the path of the type elements before they are lowered and permits a greater rate of operation of the printing mechanism.

Positive restoring mechanism for the stopping pawls 217 and latches 219 is provided under the control of the shafts 165 and 166.

A member 256 loosely pivoted on the shaft 208 is provided with a follower roller 257 which cooperates with cam 244 prior to the actuation of arm 245 by the cam. The member 256 has adjustably secured thereto a lever 258 having a roller 258a supported at its free end (see also Fig. 15). The roller 258a is adapted to engage the underside of bail 259, pivoted at 260 and the action is such that clockwise rocking of member 256 will cause rocking of bail 259 against the horizontal portion of pawls 217 to move them out of engagement with the teeth 216. Shaft 166 is provided with a cam 261 which effects similar operation of the parts during total taking operations.

Printing cam 173 is provided with a camming element 244 on its periphery, which cooperates with and rocks a follower arm 245 loosely mounted on shaft 208. A sleeve 246 (see Fig. 15) connects arm 245 with an arm 247, which is connected by a link 248 to an arm 249 secured upon a shaft 250. Shaft 250 is connected through a spring 251 with an arm 252 secured upon a rod 253. Rod 253 also carries a bail 254 extending across latches 219. Through the linkage just traced, cam 244, by rocking arm 245 in a clockwise direction, will rock rods 250 and 253 in the same direction and bail 254 will engage latches 219 to move them into engagement with the pawls 217. Shaft 166 is provided with a cam 255, which engages the free end of arm 245 to effect similar action during total taking operations. The timing is such that pawls 217 are restored in advance of the restoration of latches 219, which hold the pawls in restored position until they are again tripped by the printing magnets 223.

Figures 26, 27:
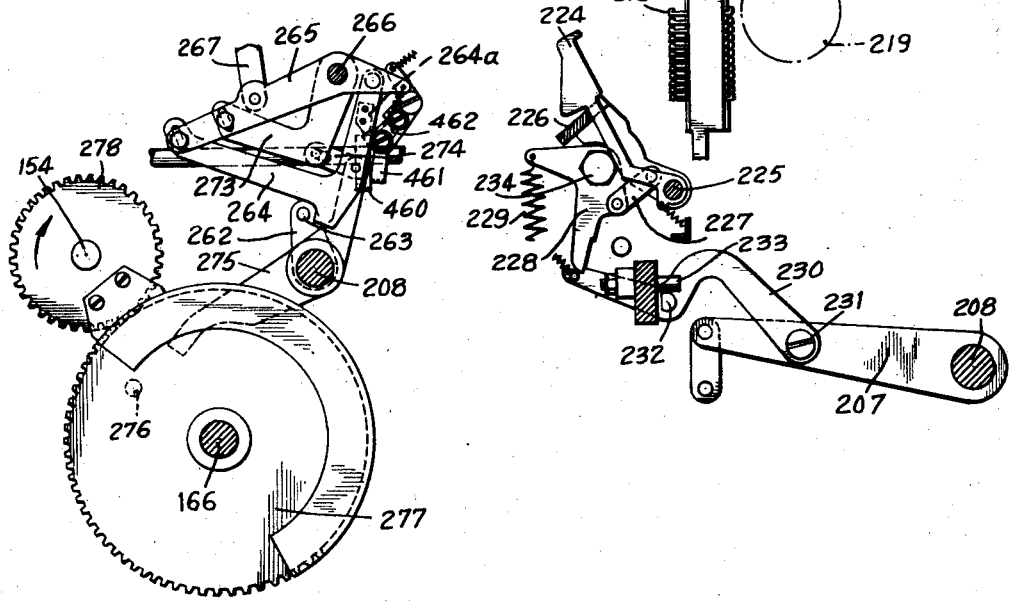
Fig. 26 is a detail of the platen spacing mechanism.
Fig. 27 is a detail of the hammer bail operating mechanism.

*Paper spacing.*—The paper spacing mechanism is shown in Figs. 9 and 26 where shaft 208 is shown as having an arm 262 secured to one end thereof. The arm carries a pin 263 which is adapted to engage a member 264 integral with an arm 265 rotatable about a fixed pivot 266. The arm 265 is connected by a link 267 to an arm 268 which has pin and slot connection 269 with an arm 270 pivoted on the supporting axis of the platen.

Arm 270 carries spring-pressed pawl 271, which is adapted to engage a ratchet 272 for driving the platen. Clockwise rocking of shaft 208 accompanied by the upward movement of the printing cross-head will rock member 264 and arm 265 in a counterclockwise direction to cause actuation of the ratchet 272 in a clockwise direction and effect spacing of the paper before the printing hammers are tripped. Arm 265 has secured thereto a further member 273 connected by a link 274 to an arm 275 loosely pivoted on the shaft 208. A pin 276, projecting from a mutilated gear 277 secured upon the total shaft 166 is adapted to rock arm 275 during total taking operations to effect an additional spacing operation of the platen. Pin 276 is so located that it actuates the paper spacing mechanism after the printing operation.

When the machine is set for listing, a block 460 (Figs. 10 and 26) secured to rod 178 engages a projection 461 of a spring-pressed latch 462 and holds the latch in such position that it cannot engage block 264a of member 264. Therefore, latch 462 and block 264a are inoperative while the machine is set for listing. As has been pointed out, when the machine is set for tabulating, the lever 177 is shifted to the position of Fig. 10 and the listing cam 173 will turn one revolution during the first card cycle. During this revolution the shaft 208 will be rocked and the paper fed one line space, as above described, but as the shifting of lever 177 to tabulating position has moved block 460 out of cooperation with projection 461, block 264a becomes locked in position by a latch 462 after member 264 has been rocked in a counterclockwise direction about pivot 266. The spacing of the paper takes place during the early part of this cycle. During the same cycle, after the spacing has taken place, printing is effected; that is, during tabulating operations, printing from the first card will be of the group designation number only.

As the list cam 173 is locked against operation at the end of the first card cycle, there will be no further printing during the continued operation of the machine until a total is taken. In the meantime, as the operation of the paper feed mechanism has been suppressed by the latching of block 264a, the line on which the group number is printed remains in printing position so that when the total is eventually printed, it is on the same line with the group number. When the total is printed, shaft 208 is again rocked in a clockwise direction, this time by cam 201, but no movement of 265 or 267 takes place on this up stroke of the type bars due to member 264 being held by latch 462. The result is that paper is not fed at this time and the total is printed on the same line as was the indication number during the first tabulating cycle. Near the end of the revolution of shaft 166, after shaft 208 has returned to its normal position, pin 276 on gear 277 makes contact with lever 275 and causes it to rock about shaft 208 in a clockwise direction, the slot in link 274 allowing it to move freely. As lever 275 nears the end of its clockwise rocking movement its upper arm acts against projection 461 of latch 462, releasing block 264a and allowing member 264 and attached members including link 267 to resume normal position with the shoulder of member 264 against pin 263. As soon as pin 276 has passed the end of lever 275, the latter will be drawn by its spring to normal position. It will be observed from the above that lever 275 has two entirely different functions to perform, depending upon whether the machine is set for tabulating or listing.

The mutilated gear 277 carried by shaft 166 has driving engagement with a gear 278 mounted on the extremity of the reset shaft 154, which, as explained hereinbefore, actuates the resetting mechanism of the accumulators. The relationship between gears 277 and 278 is such that the shaft 154 is driven through one revolution during the second half of the revolution of shaft 166, it being understood that the printing mechanism is operated by the shaft 166 during the first half of its revolution.

Circuit controlling devices

Figure 13:
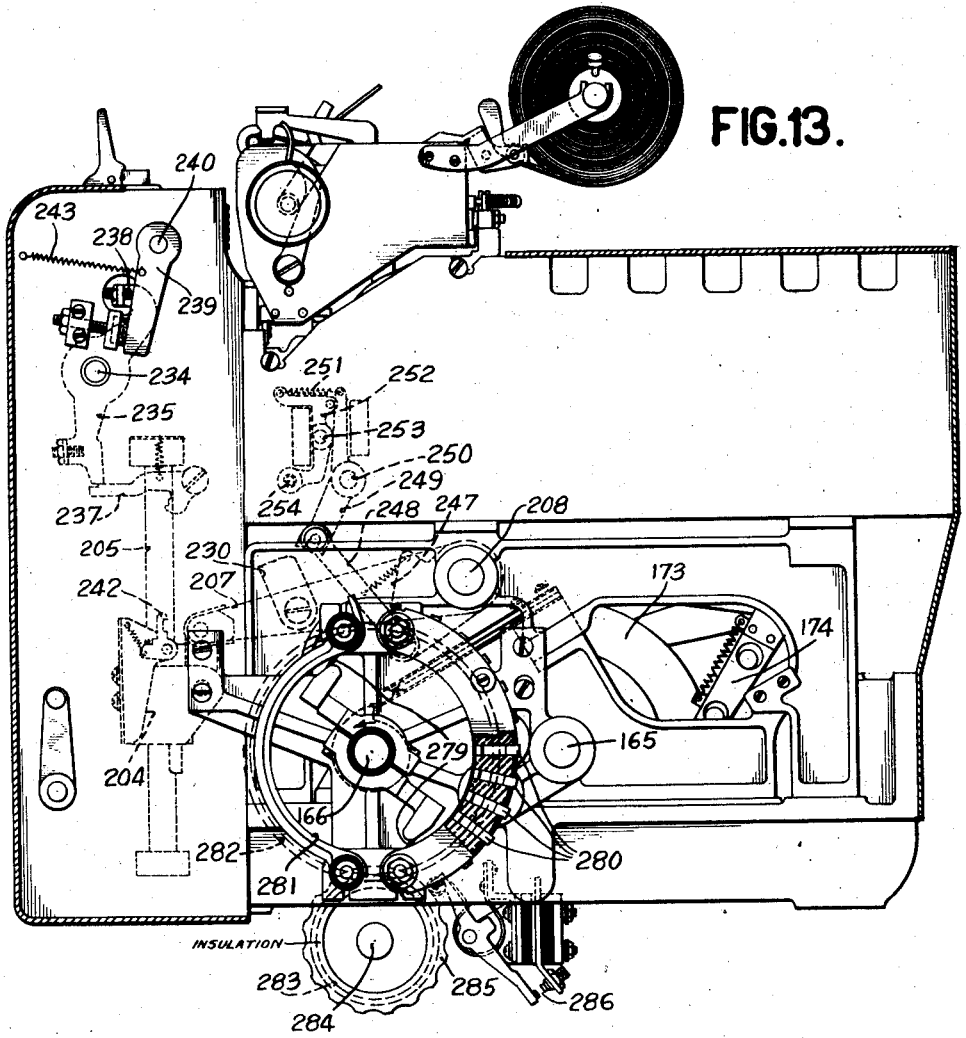
Fig. 13 is an end view of the printing mechanism with the cover removed. The view is taken looking in the direction of the arrows indicated in Fig. 1 at 13—13.

As shown in Figs. 13 and 15, the shaft 166 carries a plurality of contact operating cams controlling pairs of contacts each of which is prefixed with the letter "P". These cams are made of insulating material and their configuration is such as to control the opening and closing of their associated contacts at varying times in the operation of the machine to control circuits during total taking operations, as will be explained in connection with the circuit diagram. The timing of the operation of these contact devices is illustrated diagrammatically on the timing chart in Fig. 30.

Carried by the extremity of shaft 166 and insulated therefrom are pairs of electrically connected brushes 279, one brush of which contacts with conducting segments 280, while the other wipes over a common arcuate conducting strip 281. The timing is such that a brush 279 successively contacts with each of the segments 280 as a corresponding type element 218 approaches printing position opposite platen 219. These contact devices, generally known as total printing emitters, control the total printing circuits in a manner to be more fully explained hereinafter.

Shaft 166 has secured thereto a gear 282 meshing with a gear 283 carried by a shaft 284 upon which is mounted a circuit breaking cam 285 which is adapted to control the operation of a pair of contacts 286 during total taking operations. In Fig. 9 is shown a pair of contacts 287 which are controlled by an arm 288 carried by the pivot shaft 199 of the magnet armature 198. These contacts are closed when the magnet 197 is energized to actuate its armature.

In Fig. 7 an idler gear 289 driven from one of the gears 66 on shaft 44 drives a gear 290 carried by a shaft 291. The shaft 291 carries a plurality of cams which control the operation of associated pairs of contacts, which are prefixed with the letter "L" whose timing is shown on the time shaft (Fig. 30) and whose functions will be explained in connection with the circuit diagram. Several multi-contact relays 292, 293 and 294 are located at convenient places in the machine and are arranged so that energization thereof will cause actuation of associated multiple pairs of contacts whose functions will be properly described in connection with the circuit diagram.

Plugboard

The plugboard of the machine is shown in Fig. 1 and comprises a panel of insulating material 298 provided with suitable plugboard sockets. A horizontal row of eighty plugboard sockets 300 is provided, one socket for each of the eighty lower analyzing brushes LB. These sockets are individually connected to the corresponding lower brushes. A similar row of eighty sockets 301 is likewise provided and each is connected to the corresponding one of eighty upper analyzing brushes UB. Five groups of sockets 302 are provided, there being one group for each of the accumulators, two of the sockets being related to each denominational order of an accumulator. Each such pair of plug sockets is connected to the entry controlling devices of a denominational order of an accumulator and also to a corresponding printing control device in the printing section of the machine. If it is desired to enter data from, let us say, the fortieth column of the record cards into the units order of accumulator #2, a plug connection 303 is made between the fortieth plug socket 300 and one of the sockets 302 farthest to the right of the second group of sockets 302. This connection will permit entry of data from the fortieth column of each record card into the units order of accumulator #2 and will permit printing from a related type bar, subject, to the operation of further controlling circuits, which will be explained in more detail in connection with the circuit diagram.

Two groups of plug sockets 300 and two sets of double plug sockets 304 are provided which are directly connected to the printing magnets of the first two banks of type bars on the left of the printing unit (see Fig. 15). These two banks of type bars are known as listing banks and are used to print classification data which it is not desired to enter into the accumulating devices. If it is desired to list data from, let us say, column twenty, a plug connection 305 is made between the twentieth plug socket 300 and a selected one of sockets 304. If it is desired to have this data printed in more than one printing position, a further plug connection, such as indicated at 306, may be made between the first selected printing position and a second position. A group of twenty double plug sockets 307 and a row of plug sockets 308 are provided at the left end of the plugboard, which are associated with the group indicating devices of the machine. Circuits controlled by plug connections to these sockets permit the entry of data into an accumulator or a listing bank during the analysis of the first card only of each group. The entry of such data into the accumulator permits its retention thereby until total taking operations are performed, when it will be read from the accumulator to print the data, together with the totals from other accumulators. The manner in which a particular column is plugged for group indicating is illustrated in Fig. 1 and comprises a plug connection 309 which is made from, let us say, the tenth lower brush socket 300 to one of the sockets 307. A further plug connection 310 is then made from the corresponding plug socket 308 to a plug socket 302 of the accumulator order in which it is desired to enter the data to be indicated. The devices which cooperate with these plug connections will be further explained in connection with the circuit diagram.

The left end of the plugboard is further provided with three rows of plug sockets 311, 312 and 313, a minor control socket 314 and a major control socket 315, through which suitable plug connections will control the automatic operation of the machine upon minor and/or major changes in group classification. To illustrate, let it be assumed that the machine is to perform minor total taking operations under control of classification data in columns 5 and 6 of the record cards and to control major total taking operations under control of classification data in columns 1 and 2 of the record cards. Plug connections 316 are accordingly made between the fifth and sixth sockets 300 to the two plug sockets 311 farthest to the right and plug connections 317 are made from the corresponding upper brush sockets 301 to the corresponding plug sockets 313. Similarly, plug connections 318 and 319 are made from the first two sockets 300 to the next adjacent sockets and from the first two sockets 301 to the correspondingly adjacent sockets 313. A further plug connection 320 is made between one of the sockets 312 as indicated and a connection 321 is made between sockets 315 and another of the sockets 312. Usually the columns of the card which are used for controlling are also connected through the group indicating devices for first card listing. In this event, plug connection is first made between sockets 300 and sockets 307 and thence from the second socket 307 to the plug sockets 311 as outlined. The devices of the machine which are controlled through these connections will be more fully dealt with in connection with the circuit diagram, at which time the connections just outlined will be again referred to.

A so-called class selecting device is provided in the machine which has associated therewith three rows of plug sockets 321, 322 and 323 and a pair of plug sockets 324. The function of this class selecting device, whose detailed operation will be explained in connection with the circuit diagram, permits the entry of data from more than one field or position of the record card into a single accumulator or it may be connected to permit the distribution of data from a single field of the record card into either of a selected pair of accumulators. Plugging for the first of these conditions is illustrated in Fig. 1, where it is assumed that data analyzed by the lower adding brushes in columns 50 and 55 is to be entered in the units position of accumulator 3. To this end a plug connection 325 is made from the fifty-fifth socket 300 to one of the sockets 321. A further connection 326 is made from the fiftieth socket 300 to a corresponding socket 322. A further connection 327 is then made from the socket 323 in the same column to the units order socket 302 of accumulator #3. Assuming that all entries controlled through the fiftieth socket 300 are to be entered into accumulator #3 when the controlling record card has a perforation in the eleventh, or, as it is commonly called, the "X" index point position, in the sixtieth column; a plug connection 328 is therefore made between the sixtieth plug socket 301 to one of the sockets 324. With this plugging arrangement and in a manner to be more fully set forth hereinafter, all record cards which are "X" punched in the sixtieth column will have the data in their fiftieth columns entered into accumulator #3 and those cards which are not "X" punched in the sixtieth column will enter data from their fifty-fifth columns into accumulator #3.

*General description of the wiring diagram*

The electric circuits of the machine are shown in Figs. 29, 29a and 29b. In the following description, the explanation will be divided into the following headings, permitting the separate detailed explanation of each of the main units, to wit:

Tabulating driving circuits
Resetting circuits
Automatic restarting circuits
Automatic control circuits
Repeated reset operations
Adding and printing circuits
Total printing circuits
Accumulator total print selecting circuits
Accumulator reset selecting circuits
Subtracting circuits
Balance printing circuits
Group indicating circuits
Extra listing banks
Class and field selection circuits
Accumulator selecting and controlling circuits In the circuit diagram, relay magnets and their associated contacts have generally been shown in close proximity to one another and the relay contacts have been designated with the same reference numeral as the controlling magnet, with a lower case letter suffixed thereto. In certain instances, where it would add to the complexity of the circuit connections to show the relay magnets and their contacts together, the magnet has been shown in dotted outline, adjacent to the contacts which it controls. It may also be pointed out here that a number of cam controlled contacts are shown in the circuit diagram. Certain of these operate during tabulating and listing operations of the machine and these have been prefixed with the letter "L". Those which operate only during total taking operations are prefixed with the letter "P".

*Tabulating driving circuits*

*Dynamotor.*—The circuits of the machine may be connected to a source of current through a switch S indicated in the upper left hand corner of Fig. 29. With the switch S closed, current is supplied to main lines 330 and 331, which through wires 332 and 333 connect these lines to the input side of a dynamotor indicated at DY. The output side of the dynamotor is connected to wires 334 and 335 which supply current to the machine proper. The use of the dynamotor DY permits the operation of the tabulating machine from a source of current whose potential is different than that for which the various electrical devices of the machine are adapted. Specifically, if the source of current is 220 volts D.C., the dynamotor, when wired as shown, will impress current of 110 volts D.C. on the lines 334 and 335. If the supply of current is 110 volts, then, of course, the dynamotor may be dispensed with and direct connection made between lines 330 and 334 and lines 331 and 335 as indicated by dotted lines. When current is initially supplied to the dynamotor, the current through the input armature thereof will pass through a resistance 336 in parallel with which are wired contacts 337a of a relay magnet 337. Magnet 337 is directly connected across the output lines 334 and 335 of the dynamotor and close as soon as the voltage delivered is sufficient to operate the relay. Contacts 337a close to shunt out the resistance 336 and permit the full input current to be applied to the input armature of the dynamotor.

*Initial reset cycle.*—In tabulating machines of this class, it is customary to send the machine through a reset cycle of operations to insure that the accumulating devices are clear and also to set up the automatic control mechanism. These resetting operations will be more fully explained under the heading Resetting circuits. Suffice it to say at the present time, however, that during the resetting operations, motor control relay magnet 338 is energized and a holding circuit provided for maintaining it energized until the classification data of the record cards being analyzed change. Contacts 338a of this relay will therefore be closed and the contacts 338b opened.

*Starting circuit.*—The machine is now ready to start card feeding operations after cards have been placed in the feed magazine 28. Depression of the start key to close contacts ST will complete a circuit as follows: from line 334, closed cam contacts P1, tabulating clutch magnet 22, contacts 27, start relay 339, start key contacts ST, stop key contacts SP, closed relay contacts 338a, to line 335. Energization of magnet 22 will cause opening of contacts 27 in the manner explained above and the circuit will now include relay magnet 340, which is wired in parallel with the contacts 27.

*Tabulating motor circuits.*—Magnet 340 will close its contacts 340a to complete a circuit through the tabulating motor TM as follows: from line 330, motor TM, contacts 340a, to line 331, thus initiating the operation of the motor. Motor TM is of the two-speed type, having a resistance 341 connected in series with its field winding. Shunted across the resistance 341 are the contacts 188 which are closed, as previously explained, whenever the machine is listing; that is, whenever the printing mechanism is in operation, the closure of the contacts 188 will shunt out the resistance 341 and cause the motor TM to operate at a slow speed. A further pair of contacts 342b are connected in parallel with resistance 341 and contacts 188 and are controlled by a relay magnet 342. The object of the contacts 342b is to shunt out the resistance 341 at the start to insure starting of the motor at its slow speed. After the machine has operated through a portion of a cycle, cam contacts L1 close momentarily and complete a circuit from line 330, wire 343, relay magnet 342, contacts L1, wire 344, contacts 340a, to line 331. The consequent closure of contacts 342a will set up a holding circuit for the magnet 342 traceable from line 330, wire 343, magnet 342, contacts 342a, wire 344, contacts 340a, to line 331. Energization of magnet 342 will, of course, open contacts 342b, permitting the inclusion of resistance 341 in the field circuit of motor TM, if the machine is set for tabulating operations.

Inspection of the timing diagram (Fig. 30) will show that the time of closure of contacts L1 occurs after the machine has turned through substantially a third of a cycle so that it will be apparent that operation of the machine for this portion of the cycle will be at the slow speed for both listing and tabulating conditions. During the first cycle, the record card C will be advanced from the supply magazine to a position where its leading edge is in contact with the upper brushes UB.

*Tabulating clutch holding circuit.*—Energization of the start relay magnet 339 will effect closure of its contacts 339a to set up a holding circuit for the clutch magnet 22 traceable from line 334, cam contacts P1, magnet 22, relay 340, magnet 339, contacts 339a, wire 345, cam contacts L2 to line 335. Toward the end of this cycle, cam contacts L2 break, as indicated in the timing diagram, and the machine will coast through the remainder of the cycle to home position, which will hereinafter be termed the D position, as it is commonly known in the art.

*Second tabulating cycle.*—A second machine cycle is now again initiated by depression of the start key to close contacts ST and a second cycle will follow in the same manner as the first. During this second cycle, the first card is advanced to the lower brushes and a second card is fed from the supply magazine. Following this second cycle, the machine may do one of two things. If the automatic resetting switch 346 is open, the machine will stop as before and if the switch is closed, the machine will automatically enter upon a resetting cycle of operations. If the machine stops, the same resetting cycle is initiated by depression of the reset key to close contacts R. It will be pointed out under the heading Automatic control circuits that the motor control relay 338 is deenergized during the second tabulating cycle just mentioned, so that contacts 338a open and 338b close during the latter part of the cycle.

Resetting circuits

*Automatic reset clutch circuits.*—If switch 346 is closed, the closure of cam contacts L3 toward the end of the second cycle will complete a circuit traceable as follows: from line 335, contacts 338b, switch 346, now closed, cam contacts L3, wire 347, relay magnet 348, cam contacts P3 to line 334. Closure of contacts 348a will set up a holding circuit for magnet 348 traceable from line 334, contacts P3, magnet 348, contacts 348a, to line 335. At the very end of the cycle, contacts L4 close, permitting the completion of a circuit from line 335, contacts 348a, contacts L4, reset clutch magnet 197, contacts 384c, contacts P3, to line 334. The contacts 384c are controlled by a multi-contact relay magnet 384 (Fig. 29b) which is energized through a circuit extending from line 334, magnet 384, relay contacts 338c, contacts 348b, cam contacts P9, wire 354 (see also Fig. 29), card lever contacts 59 to line 335. The contacts 338c are controlled by the motor control magnet 338 and are opened when magnet 338 is deenergized due to a change in the group control member, in a manner to be explained. Contacts 348b are opened by the magnet 348 when the latter is energized to initiate a resetting cycle of operations. It is thus apparent that if either of the contacts 338c and 348b are open, magnet 384 is deenergized to permit closing of contacts 384c in the reset clutch magnet circuit. It is thus apparent that during card feeding cycles, contacts 384c are held open and prevent completion of the reset clutch magnet circuit. Magnet 197 will trip the reset clutch mechanism and will cause closure of the contacts 287 in the manner already explained.

*Reset motor circuit.*—This will permit completion of the circuit through the reset motor RM which is traceable from line 330, motor RM, magnet 350, wire 351, contacts 287, wire 352, to line 331. The motor RM will thereupon operate to drive the resetting mechanism for a cycle of operations during which contacts P4 close to short circuit the contacts 287 and maintain the circuit through motor RM, and shortly thereafter, contacts P9 (Fig. 29b) open to break the circuit through the magnet 384 which in turn permits closing of contacts 384c. Later, contacts P3 open to break the holding circuit of magnet 348.

Cam contacts P4 open at the very end of the cycle to break the circuit through the motor RM.

*Manual reset.*—If the machine had stopped after the second tabulating cycle, due to the open position of switch 346, the resetting cycle is initiated by depression of the reset key to close contacts R, which completes a circuit from line 335, contacts L2, wire 345, contacts 339b, contacts R, wire 347, relay 348, contacts P3, to line 334. Energization of magnet 348 controls the completion of the above traced circuits through reset clutch magnet 197 and the subsequent completion of the circuit through the reset motor RM.

Automatic restarting circuit

It has thus far been explained that the initiation of operations of the machine require a first resetting operation, followed by two successively, manually initiated, tabulating cycles, followed by a resetting cycle which is either manually or automatically initiated. At this point, the first card is in readiness to pass and be analyzed by the lower brushes LB and the second card is in readiness to pass and be analyzed by the upper brushes UB and the automatic control mechanism is in readiness to compare the classification data of the cards as they pass through the machine. Following the reset cycle just explained, the machine will stop, if the automatic start switch 353 is open, and further operations of the machine will be initiated by depression of the start key to close contacts ST. If switch 353 had been previously closed, however, the machine will automatically enter upon card feeding and analyzing operations immediately upon completion of the last resetting cycle. This is brought about in the following manner:

Relay contacts LCLa will have been closed due to the arrival of the first card at the lower brushes and during the reset cycle just traced, cam contacts P2 closed momentarily at the end of the cycle, thereby establishing a circuit from line 335, contacts 338a, contacts SP, LCLa and P2, switch 353, start relay magnet 339, contacts 27, tabulating clutch magnet 22, contacts P1, to line 334. The energization of magnet 22 will, as explained above, cause the machine to enter upon a tabulating cycle of operations, during which the record cards are successively analyzed and the data thereon entered into the recording devices.

*Card lever circuits.*—Closure of lower card lever contacts 59 completes a circuit from line 335 (Fig. 29), contacts 59, wire 354 (see also Figs. 29a and 29b), wire 355 (Fig. 29b), a number of relay magnets LCL, wire 357, to line 334. A number of magnets LCL are provided to distribute the multiplicity of contacts to be controlled. Closure of relay contacts LCLb together with the closure of contacts LCLa, mentioned above, will complete a holding circuit for relays LCL through cam contacts L6. This circuit is from line 335, contacts L6, contacts LCLb, magnets LCL and wire 357 to line 334. As long as record cards continue to pass the lower brushes, magnets LCL will remain continuously energized since contacts L6 are timed to be closed during the interval that the card lever contacts 59 open (see the timing chart, Fig. 30).

The upper card lever contacts 58 similarly complete a circuit from line 335, contacts 58, magnets UCL, wire 357, to line 334. The closure of contacts UCLb sets up a holding circuit through cam contacts L5, whose function and timing is the same as that of contacts L6.

Automatic control circuits

The automatic control circuits which keep the machine in operation as long as classification data on successively analyzed cards are the same will now be explained in detail.

A number of double-wound relay magnets are provided, each having a pick-up winding 359 and a holding winding 360. Windings 359 terminate in the plugboard sockets 311 and 313 through which the windings may be plug connected in series with the brushes UB and LB, as explained above. Since the index point positions on the card passing the lower brushes are analyzed concurrently with the analysis of the corresponding index point positions of the following card passing the upper brushes, a perforation occurring in any index point position of both cards will complete a circuit at a time in the cycle of the machine corresponding to the location of the perforation.

Control pick-up circuit

This circuit is traceable as follows: from line 334 (Fig. 29), cam contacts L11, wire 361, upper brush contact roller 55, perforation in the card at the upper brushes, upper brush UB, plug socket 301, plug connection 317 (Fig. 1), socket 313, winding 359, socket 311, connection 316, socket 300, brush LB, perforation in the card at the lower brushes, lower brush contact roller 56, circuit breaking devices 61, lower card lever contacts 59, to line 335.

*Control holding circuit.*—Energization of winding 359 will close its contacts 359a and 359b, the former setting up a holding circuit for the windings which is traceable as follows: from line 334, wire 362, cam contacts L12, contact 359a, winding 360, wire 363, to line 335. Contacts L12 hold the windings 360 energized until the end of the cycle and until the mechanism has performed its controlling functions. It is thus apparent that the windings 359 are differentially energized in accordance with the value of the controlling perforation and that the windings 360 hold all the selected circuits to keep contacts 359b closed in positions in which agreement occurred between the cards.

In the machine there are provided sixteen sets of windings 359, 360. On the circuit diagram, however, only five are shown, to avoid undue repetition of similar parts. After all the index point positions have been analyzed, the machine tests the setting of the contacts 359b. If there was agreement in all the control columns, the contacts 359b corresponding to those columns will be closed and a series circuit will be traceable through each such contact. The contacts associated with the so-called minor controlling field of the record card will be grouped together and a connection 320 made between the plug socket 312 of the last position into minor plug socket 314, as explained in connection with Fig. 1. This places the first two contacts 359b (Fig. 29), counting from the bottom, in the minor holding circuit. The plug connection 321 made as shown to the plug socket 312 of the fourth contact 359b, places the third and fourth contacts 359b in the major holding circuit. The ultimate object of the group control mechanism is to keep the motor control relay magnet 338 energized, if there is agreement in both the minor and major control fields and to cause deenergization of magnet 338, if there is a break or disagreement in either of the two fields.

*Minor holding circuit.*—Magnet 338 is normally held energized through a circuit set up during the initial resetting cycle of the machine. During this cycle, cam contacts P7, P8 close at the same time. The circuit will be completed from line 334, contacts P7, switch 365, contacts P8, minor control relay magnet 366, magnet 367, wire 368, motor control relay magnet 338, wire 369, cam contacts L10, L9, wire 363, to right side of line 335. Minor control relay 366 closes its contacts 366a to establish a holding circuit from line 334, contacts 366a, magnet 366 to line 335 as before. This circuit is called the minor holding circuit and remains energized as long as minor classification data on the record cards do not change.

*Major holding circuit.*—Concurrently with the setting up of the minor holding circuit, the major holding circuit is also completed upon closure of contacts P7, the circuit establishing from line 334, contacts P7, major control relay magnet 370, cam contacts L9, wire 363, to line 335. Contacts 370a, when closed, provide a holding circuit for the major control relay magnet 370 in parallel with the holding circuit of the minor control relay and this circuit remains energized until there is a disagreement in the classification data of the major control field of the record cards.

If there is a change in the minor group number, the minor holding circuit alone is broken, but if there is a change in the major group number, both the minor and the major circuits are automatically broken. This provides against the possibility of the major number changing and the minor group number remaining the same which would preserve the control circuit to magnet 338. During each cycle of the machine, cam contacts L10 and L9 open momentarily. Since these contacts are in the minor and major holding circuits respectively, these circuits would be interrupted at this time, if no other path were provided around the contacts.

*Minor shunt circuit.*—During tabulating and listing cycles of the machine, the contacts 359b provide a shunt circuit around contacts L10 and L9. For example, the two lowermost contacts 359b, when both are closed and when plug connection 320 is made, as shown, short circuit contacts L10, the short circuit running from the lower blade of contacts L10 to the lowermost contacts 359b, then to the upper pair, plug connection 320, socket 314, to the upper blade of contacts L10.

*Major shunt circuit.*— The major shunt circuit comprises all of the contacts 359b used for controlling and short circuits both contacts L10 and L9, the short circuit extending from the lower blade of contact L10, serially through the four selected contacts 359b, in accordance with the example selected, plug connection 321, plug socket 315, relay contacts UCLC, which are closed while cards are passing the upper brushes, to wire 363 and line 335. Thus, if at the time contacts L9 and L10 open and the control relays have registered agreement between the two cards analyzed, the minor and major holding circuits will be sustained through the contacts 359b. If, at such time, one of the two lowest contacts 359b had failed to close, the minor holding circuit would have been broken, deenergizing relay magnets 366, 367 and the motor control relay 338, causing stoppage of the machine or automatic entry upon a total taking and resetting cycle. If either of the contacts 359b of the major pair of contacts had failed to close, both the minor and major holding circuits would have failed to remain energized and the major control relay magnet 370 would also have been deenergized.

During the subsequent total taking cycles, closure of cam contacts P7 and P8 will again establish the minor and major holding circuits and comparison of the successively fed record cards of the next group will take place and card feeding will proceed until there is again a break in either of the circuits.

It may here be mentioned that with the automatic reset switch 346 closed, the machine will perform a single cycle of total taking operations and the minor and major holding circuits will be concurrently re-established during this single cycle.

*Automatic control cutout switches.*—A switch 371 is provided, which, when closed, permanently short circuits contact L10 and a second switch 372 short circuits contact L9. If both these switches are closed, the automatic control mechanism is inoperative and the minor and major holding circuits remain established indefinitely. If controlling is desired on only a single field, then switch 371 alone is opened and the major holding circuit remains established and the minor holding circuit is under control of the contacts 359b. Various contact devices are included in this control mechanism to delay its functioning until cards have been advanced into the machine in readiness for actual comparison with one another. These devices may be best explained by examining the several starting cycles of the machine.

*First card cycle.*—The very first cycle, which is the manually initiated reset cycle, clears the accumulators and operates contacts P7 and P8 to initially establish the minor and major holding circuits and energize motor control relay 338 so that the starting circuit can be completed. At this time, the lower card lever relay magnets LCL are deenergized as are also the upper card lever relay magnets UCL and their respective contacts LCLg and UCLf short circuit contacts L10 and L9 so that during the first card feeding cicle, the opening of contacts L9 and L10 is ineffective to break the minor and major holding circuits. At the end of this cycle, however, the upper card lever contacts 58 close, causing energization of upper card lever relay magnets UCL and opening of contacts UCLf. As explained above, the machine comes to rest after this first card feeding cycle with the first card about to pass the upper brushes. A second manually initiated cycle then takes place.

*Second card cycle.*—During this cycle, none of the contacts 359b can be closed since the lower brushes LB, which receive current through the lower card lever contacts 59, do not receive current. Opening of contacts L10 therefore will find no circuit for the minor holding relay magnet and the same will therefore be interrupted and the major holding circuit will likewise be interrupted. At this time, the leading card will be at the lower brushes after having closed card lever contacts 59 to supply current to the lower brushes and to cause energization of lower card lever relay magnets LCL, opening the contacts LCLg. The following total taking and resetting cycle will again set up the holding circuits and the machine will proceed with its tabulating operations under the joint control of the contacts L9, L10 and contacts 359b.

*Last card cycle.*—When the last card in the machine has passed the upper brushes and is passing the lower, and the upper brushes are making contact on the bare contact roller 55, inspection of the circuit diagram (Fig. 29) will show that circuits will be completed to all the active relays in the same manner as though another card of the same group were passing the upper brushes. This, of course, would indicate an agreement and the group control would not break until the lower card lever contacts opened. Such opening, however, would only initiate a minor total taking operation and not effect resetting of the major total accumulators. Therefore, it is necessary at this time to break the major holding circuit even though the shunt circuit through 359b is closed. This is brought about under control of the upper card lever contacts which open, since no card is at the upper brushes, bringing about the deenergization of the upper card lever relay magnets UCL and permitting opening of contacts UCLe. The major shunt circuit which is traceable through connection 321 and socket 315 can therefore not be completed through the relay contacts UCLe so that upon opening of contacts L9 the major holding circuit will be interrupted and the machine will enter upon major total taking operations.

Repeated reset operations

For certain classes of work it is desirable to have the machine go through two total taking and reset cycles of operation following each major group change and a single cycle following each minor group change. Where such operation is desired, switch 365 (Fig. 29) is thrown from its full line to its dotted line position, thereby cutting contacts P8 out of the circuit and contacts P8a into the circuit. Inspection of the time chart (Fig. 30) will show that cam contacts P8a close and open again before contacts P7 close. Therefore, during the reset cycle, contacts P8a close and open without effect, following which contacts P7 close to set up the major holding circuit causing closure of contacts 370a. The minor holding circuit remains interrupted. The magnet 367 in the minor circuit therefore remains deenergized and its contacts 367a which are wired across cam contacts P3, whose function is to break the circuit through the reset clutch magnet 197 during the resetting cycle, will remain closed and prevent such interruption so that a second resetting cycle will follow immediately after the first. During the second resetting cycle, the minor holding circuit will be re-established through a circuit through line 334, wire 373, contacts 370a, switch 365, contacts P8a, magnets 366, 367, wire 368, magnet 338, wire 369, contacts L10, wire 363 to line 335. This circuit will be set up before contacts P3 open so that when they open later, contacts 367a will also be open and the reset clutch circuit will then be interrupted. This type of operation is known as successive resetting and permits the recording of the minor and major totals on separate lines and the resetting of the accumulators for minor and major totals successively. As explained above, the operation of the machine commences with a preliminary resetting cycle. When the machine is set for successive resetting two such reset cycles will take place followed by two manually initiated card feeding cycles, as explained, which in turn are followed by another reset operation.

In order to limit this reset operation to a single cycle card lever relay contacts LCLf are wired across cam contacts L9 and thereby serve to maintain the major holding circuit when these cam contacts open so that the machine will only go through a single reset cycle of operations at this time. After cards commence to pass the lower brushes, however, the relay contacts LCLf are opened and maintained in such position. The manner in which the accumulators are selected for successive resetting will be explained later.

Adding and printing circuits

As shown in Fig. 29, the adding magnets 77 are wired directly to the plug sockets 302 and the printing magnets 223 are wired to the sockets through the normally closed contacts 374a which are controlled by a multi-contact relay magnet 374. As explained in connection with the plugboard, the sockets 302 may be plug connected to the lower brush sockets 300 and a perforation in any column analyzed by the lower brushes will then be completed as follows: from line 335, lower card lever contacts 59, circuit breaker contacts 61, common conductor 56, perforation in the record card, brush LB, plug socket 300 (see also Fig. 1), plug connection 303, socket 302, magnet 77, and branching at socket 302, through contacts 374a, to print magnet 223 and thence to line 334. In this manner the adding magnet 77 and a corresponding printing magnet 223 are concurrently energized through the parallel circuit traced and the number represented by the location of the perforation will be entered into the adding magnet and printed under control of the printing magnet.

*Non-printing control.*—If it is desired to enter data into the accumulator without the accompaniment of printing, a switch 392 related to the accumulator is moved to closed or dotted line position, as indicated at the bottom of Fig. 29. As explained above, the magnet 384 is energized during card feeding operations so that contacts 384b are closed during the same period.

Cam contacts L14 which are closed during the entering portion of the cycle (see the timing diagram Fig. 30) complete a circuit from line 334, contacts L14, switch 392, contacts 384b, multi-contact relay magnet 374, to line 335. Energization of magnet 374 will open its related contacts 374a and hold them open during the entering portion of the cycle so that circuits from the lower brushes LB to the plug sockets 302 will not be completed to the printing magnets 223 and the accumulated data will accordingly not be listed.

Total printing circuits

During total taking operations, the magnet 374 is energized and causes opening of contacts 374a and closure of contacts 374b. The closing of the latter contacts connects the printing magnets 223 to the common conducting strips 112 of the accumulator read-out device. During the total taking cycle, circuits will be completed through the read-out devices 111 and 112 at differential times according to the position of the brushes 110 through circuits of which the following is representative. Assuming the brush 110 in the units or "1" position of the accumulator to be standing at "4", a circuit will be completed when one of the brushes 279 contacts with the "4" segment 280 as follows: from line 335, switch 375, circuit breaking contacts 286, common 281, brushes 279, "4" segment 280, "4" wire 377, cable 376, continuation of "4" wire 377, "4" segment 111 in the units order, brush 110, common strip 112, closed contacts 374b, magnet 223, to line 334.

In Fig. 29 is shown the complete read-out device of accumulator #1 in which adding operations alone are performed. Associated with this accumulator are eight entering magnets 77 and nine printing magnets 223 for printing under control of the accumulator.

*Asterisk circuit.*—An additional magnet 223a controls a type bar provided with an asterisk in the position corresponding to the nine type on the other bars. This magnet is connected through a pair of contacts 374b to the "9" emitter segment 280 so that at the "9" position in the cycle, the magnet 223 will be energized to interrupt the asterisk in the printing position. In this manner, an asterisk is printed as an accompaniment to each total which, of course, may be suppressed by suppressing the operation of the printing hammer in such position.

Accumulator total print selecting circuits

Associated with each of the accumulators is a switch 378 having two pairs of insulated brushes 379 and 380 manually settable in one of four positions; an "off" position, a "progressive total" position, indicated by "PROG." in Fig. 29, a "minor total" position, indicated by "MIN." and a "major total" position, indicated by "MAJ.". Brushes 380 control the operation of the multi-contact relay magnet 374. When these brushes bridge either of the contact spots 381 or 382, a circuit is completed at the beginning of the total taking cycle upon closure of cam contacts P6. The circuit is traceable from line 334, contacts P6, segments 382 or 381 and brushes 380 through contacts 384a and magnet 374 to line 335. Contacts P6 remain closed throughout the printing portion of the total taking cycle and magnet 374 accordingly keeps its contacts 374b closed during the same period. When the brushes 380 are positioned on contacts 383, the circuit through magnet 374 is only completed when there is a break in the major holding circuit. As explained above, when the major holding circuit is interrupted, magnet 370 is deenergized and its points 370b are closed, a circuit is thereupon completed from line 334, wire 373, contacts 370b, a switch 385, wire 386, relay magnet 387, contacts 350a to line 335. It will be recalled that relay 350, which controls the contacts 350a, is connected in the circuit of the motor RM and is energized together with the motor.

Magnet 387 will close its contacts 387a to form a holding circuit from line 334, wire 390, contacts 387a, magnet 387, contacts 350a to line 335 so that upon a major change a circuit through the multi-contact relay 374 is completed from line 334, contacts P6, contacts 387b, contact spots 383 and brush 380, contacts 384a, magnet 374, to line 335. It is thus seen that when the switch is set in "Maj." position that total printing will take place only upon a break in the major holding circuit and when the switch is positioned in either of its other two active positions, namely, "Min." and "Prog.", total printing will take place upon any group change.

*Accumulator reset selecting circuits*

The contact spots 388 and 389 control the resetting of the accumulator under the several conditions indicated by the switch. The magnet 162, which causes coupling of the accumulator to the resetting shaft, is controlled by circuits through the switch 378 so that when the switch is set at "Maj." the accumulator will be reset only upon a major group change; when set at "Min." it will be reset only on a minor change; and when set at "Prog." it will not be reset.

With the brushes 379 bridging the contact spots 388, the circuit through the magnet 162 extends from line 334, wire 390, contact spots 388, and brush 379, magnet 162, contacts 350a to line 335, this circuit being completed immediately upon energization of magnet 350. With the brushes 379 set on contact spots 389, the circuit through magnet 160 is completed through contacts 370b, as follows: from line 334, wire 373, contacts 370b, switch 385, wire 386, contact spots 389, brushes 379, magnet 162, contacts 350a, to line 335. Magnet 387 is, of course, energized concurrently therewith and the holding circuit through magnet 387 also serves to hold magnet 162 energized until the reset motor RM and magnet 350 are deenergized.

When the machine is positioned for successive resetting operations, switch 385 is open and switch 391 in the lower left hand portion of Fig. 29 is closed. Selection of accumulators for minor total taking will take place in the same manner as outlined above. Under these conditions, selection of the accumulators for major total taking is to be effected only during the second reset cycle. To this end, cam contacts P10 are arranged to close at the end of the first reset cycle, completing a circuit from line 334, switch 391, contacts P10, wire 386, magnet 387, contacts 350a, to line 335. Magnet 387 accordingly will close its contacts 387a and 387b, the former setting up a holding circuit for the magnet as traced above and also completing the circuit through contacts 389 to energize the reset magnet 162 and the latter completing the circuit to contacts 383 to complete the circuit to the printing control magnet 374.

*Subtracting circuits*

In Fig. 29a is shown the wiring of a complete subtracting accumulator. The four subtracting accumulators are exactly alike and since to illustrate wiring of all four would involve the repetition of Fig. 29a, only one of these accumulators is shown in the circuit diagram.

Direct listing is effected in the same manner as explained in connection with the adding accumulator #1 of Fig. 29. The adding magnets 77 are connected to the plug sockets 302 through normally open contacts 393a of a multi-contact relay magnet 393. The magnet 77 is also connected through normally closed contacts 393b, through a common wire 394. Subtracting magnets 130 are connected to plug sockets 302 through normally open contacts 395a of a multi-contact relay magnet 395. Total printing circuits through print magnets 223 are completed in the same manner as explained in connection with accumulator #1, that is, the circuits extend through circuit breakers 286, emitter 281, brushes 279, segments 280, wires 377, segments 111, brushes 110, common conductors 112, contacts 374b and magnets 223.

The operation of multi-contact relay magnet 374 to control the printing circuits is effected through the switch 378 in the same manner as explained in connection with accumulator #1. The operation of the resetting magnet 162 is also controlled in an identical manner. The relay magnets 387 and 350, together with several of the cam contacts are shown in dotted outline to obviate the necessity of running a multiplicity of wires from the lower part of Fig. 29a to Fig. 29.

When a number is to be additively entered into accumulator #2, multi-contact relay magnet 393 is energized in advance of the analysis of the perforations representing the number to be entered and will close its contacts 393a, holding them closed during the analysis of said perforations so that circuits to the plug sockets 302 from the lower brushes will extend through contacts 393a to the adding magnets 77 and will also branch through the contacts 374a to the printing magnets 223.

If a number is to be subtractively entered, magnet 395 is energized in advance of the analysis of the number, closing its contacts 395a and a single contact 395b. The latter contact is connected to cam contacts L28 and brushes 65 of commutator 63, timed so that at the "9" position in the cycle in the machine, a circuit is completed from line 335 (Fig. 29), lower card lever contacts 59, wire 354 (Fig. 29a), brushes 65, contacts L28, contacts 395b, wire 394 and through all of the contacts 393b to all of the adding magnets. This trips all the adding wheel clutches of the accumulator at the "9" position and their index wheels commence to rotate.

As the perforations are subsequently sensed by the lower brushes, the circuits therethrough to the plug sockets 302 will continue through contacts 395a, subtracting magnets 130, to line 334, causing positive de-clutching of the adding magnets with the result that the number entered into the accumulator is the nine complement of the number analyzed by the brushes.

The carry magnet 148 in the units position is energized during the cycle through a circuit extending from line 334, cam contacts L24, contacts 395c, closed by magnet 395, magnet 148, wire 354, to line 335 as before. Magnet 148 actuates the carry mechanism of the units order so that in this position the number is complemented to ten.

If it is desired to list in the printing bank associated with an accumulator, only the items which are additively entered, the switch 392 is opened and a switch 450 is closed (Fig. 29a). Closure of the latter switch will cause relay contacts 393q controlled by the magnet 393 to short circuit the switch 392. Contacts 393c are open during adding operations. Magnet 374 remains normally deenergized, permitting the listing of the data entered into the accumulator in the manner outlined above. During the analysis of a card having data to be subtractively entered, the magnet 393 remains deenergized, its contacts 393c remaining closed so that during the entry of data from such card, a circuit is completed from line 334, contacts L14, switch 450, contacts 393c, contacts 384b, magnet 374, to line 335. Magnet 374 opens its related contacts 374a to prevent the printing of the data subtractively entered into the accumulator. This suppression of the printing of negative items is desirable when the data is arranged on the record as shown in the example of Fig. 36 where positive items are listed in the column on the left and the negative items are listed in the column on the right under control of another accumulator into which these negative items are additively entered and in which the items of the first column are subtractively entered and, incidentally, printing is suppressed in this column as explained.

The two accumulators, therefore, will accumulate balances of the two kinds of items and total printing will be effected from the accumulator containing the positive balance and this total listed in the appropriate column of the record, as indicated in Fig. 36.

In Fig. 37 is shown an example of a record prepared in accordance with a problem in which it is known in advance that the balance will be positive so that a single accumulator can be employed and the items additively or subtractively entered as the case may be. In such event, it is desirable to list the negative items together with the positive items and also to suitably identify them as by printing a minus sign adjacent to the negative items. For this condition, switches 450 and 392 are both opened, permitting constant deenergization of magnet 374 during card feeding operations so that the printing circuits will be completed for all items. To control the printing of the minus sign, a switch 451 is closed and during the analysis of a card having a negative item the magnet 395 is energized to close its contacts 395d. A cam contact L30, timed to close at the "8" index point position of the cycle, will complete a circuit from line 354, which extends to the lower card lever contacts, through switch 451, contacts L30, contacts 395d, asterisk printing magnet 223a, to line 334. The type bar controlled by magnet 223a will accordingly be interrupted with a type element, corresponding to the "8" on the numerical type bars, in printing position. This position on the asterisk type bar is provided with an element having a minus sign from which printing will be effected together with printing of the listed item.

Balance printing circuits

The total printing circuits for the subtracting accumulators are controlled in the same manner, as explained in connection with the adding accumulator #1; that is, during total printing cycles, multi-contact relay magnet 374 is energized through the switch 378 and contacts 384a. In the subtracting accumulators, however, a switch 400 is interposed between the switch 378 and contacts 384a which when the switch is in the full line position shown at the bottom of Fig. 29a, will permit energization of magnet 374 for all total taking cycles. Since it is obvious that the amount standing in the accumulator at such time may be either a positive number or a complementary number, either will be printed. However, it is usually desirable to total print from the accumulator, only when it contains a positive amount and to suppress total printing of a complementary number. For this condition, switch 400 may be moved to its dotted line position whereby it connects the switch 378 to a wire 401 which extends to the contact segments 111 of the highest denominational order position of the accumulator. It is to be noted that this connection is made to all the segments 111 except that in the "9" position. If the amount standing in the accumulator is a positive number, the brush 110a associated with the highest order will bridge one of the segments 111 other than the "9" and the common strip 112a so that during total taking cycles, magnet 374 is energized through a circuit extending from switch 378, switch 400, wire 401, one of the segments 111 other than the "9" segment, brush 110a, common 112a, contacts 384a, magnet 374, to line 335. If the accumulator contains a complementary number, the brush 110a will stand at the "9" segment 111 and magnet 374 will not be energized and consequently total printing from the accumulator will not take place. This so-called balance selection device is provided in each of the four subtracting accumulators and permits selection independently in each accumulator.

Group indicating circuits

Group indicating is defined in the tabulating art as the printing or listing of data from the first card only of a group of record cards. In Fig. 29b are shown a plurality of group indicating contacts 402a controlled by a group indicating magnet 402. The contacts 402a terminate in plug sockets 307 and 308 which are plug connected, as explained in connection with Fig. 1, between the lower analyzing brush sockets 300 and the printing magnet sockets 304 of the positions in which it is desired to indicate the data from the first card.

During any resetting cycle, cam contacts P5 (Fig. 29b) close to complete a circuit from line 335 (Fig. 29), card lever contacts 59, wire 354 (Figs. 29a and 29b), contacts P5, wire 403, relay magnet 404, wire 357, to line 334. The consequent closure of contacts 404a will establish a circuit from line 334, wire 357, magnet 404, contacts 404a, contacts L7 to line 335. Coincident with the energization of magnet 404 a parallel circuit extending from contacts P5, through a switch 405, wire 406, group indicating magnet 402, wire 357, to line 334, will energize magnet 402 to cause closure of contacts 402a and 402b. A holding circuit for magnet 402 will thereupon follow from line 334, wire 357, magnet 402, contacts 402b, contacts L7, to line 335. The contacts 402a will therefore be closed upon initiation of the card feeding cycle which follows a resetting operation and will remain closed during the entering portion of the cycle and permit the completion of circuits from the lower brushes to the devices to be controlled. Later in this first card cycle, cam contacts L7 open to break the holding circuits and magnet 402 will be deenergized, permitting contacts 402a to open so that further entries from the brush positions connected to the contacts 402a will be suppressed.

Means is provided so that fields of the record card which have been plugged for group indicating may list the data from each card without re-plugging the machine. This change is effected by simply throwing switch 405 from its full line to its dotted line position in Fig. 29b so that contacts 296 which, as explained above, are continuously closed during listing operations, will complete the circuit from line 335, through the card lever contacts and wire 354, contacts 296, switch 405, wire 406, magnet 402, wire 357, to line 334. Magnet 402, therefore, remains energized throughout listing operations and holds the contacts 402a closed during the same period.

Extra listing banks

The two listing banks at the left of the printing section, which, as explained above, are not associated with any of the accumulators, are indicated in the upper part of Fig. 29b, where four orders are shown. The magnets 223 are connected to the plug sockets 304, through multi-contact relay points 407a. The sockets 304 may be plug connected to the lower brush sockets, as explained in connection with Fig. 1, and during the entering portion of each cycle, cam contacts L15 will be closed to complete a circuit from line 334, contacts L15, switch 408, magnet 407, to wire 354, card lever contacts 59 (Fig. 29) to line 335. The contacts 407a will therefore be closed during entering portions of the cycle and circuits may be completed to the printing magnets 223. If it is desired to group indicate in these extra printing banks, the switch 408 is moved to its dotted line position and the circuit to magnet 407 will extend through contacts 404b of magnet 404, which, as just explained, is energized during the first card cycle only, so that magnet 407 will be energized during the analysis of the first card of each group and will be deenergized during the analysis of the remaining cards of the group.

Class and field selection circuits

The class selection plug sockets 321, 322 and 323 are shown connected to their associated contacts 409a and 409b at the bottom of Fig. 29b. When the device is used for class selection, which may be defined as the entering of data from one field of the record into either of a pair of accumulators, or more broadly, from one field into any of a number of accumulators, the sockets 323 are connected to the lower brush sockets 300 and entering circuits will normally extend through the normally closed contacts 409a to sockets 321, which are connected, as indicated previously, to one accumulator. Cards having an "X" perforation in a predetermined column will cause closure of contacts 409b and opening of 409a so that the circuits will now extend through contacts 409b to sockets 322 and from there to the second accumulator. Shifting of the contacts is brought about in the following manner: A plug connection between the upper brush socket 301 of the "X" punched column in the record card and plug socket 324, as previously indicated, will complete a circuit from line 334 (Fig. 29), cam contacts L11, wire 361, upper brush common 55, "X" perforation, brush UB, socket 301, plug connection 328 (Fig. 1), socket 324 (Fig. 29b), cam contact L23, which closes at "X", magnet 410, wire 411, contacts UCLd to line 335.

Energization of magnet 410 will close contacts 410a and 410b, the former providing a holding circuit for the magnet which extends from line 334, contacts L25, wire 412, contacts 410a, magnet 410, wire 411, contacts UCLd to line 335. Contacts 410b complete a circuit from line 334, contacts L25, wire 412, contacts 410b, class selection magnet 409, wire 413, to line 335. Magnet 409 closes a pair of contacts 409c which set up a holding circuit for the magnet, traceable from line 335, wire 413, magnet 409, contacts 409c, wire 414, cam contacts L15, to line 334. Contacts L15 remain closed throughout the entering portion of the next card cycle during which the "X" punched card is passing the lower brushes so that the data will be entered through contacts 409b into the selected accumulator.

*Field selection.*—For field selection, which may be defined as the entering into a single accumulator of data entered into one of two fields of a record card, the plug sockets 321 are connected to the lower brush sockets 300 of one field and the plug sockets 322 are connected to sockets 300 of a second field and the sockets 323 are connected to sockets 302 of one of the accumulators. It will therefore be apparent that entering will normally be effected through contacts 409a from the first field and cards which have an "X" punching in a designated column will cause shifting of the contacts so that data will be entered into the accumulator from the second field. It will also be obvious that the operation of the class selection device is the same for both class selection and field selection, the different results being determined wholly by the arrangement of the plugging connections.

Accumulator selecting and controlling circuits

Each of the accumulators #2 to #5 is arranged for operation so that the data from certain types of cards may be additively entered or subtractively entered or not entered at all. A simplified plugging arrangement is provided whereby a single plugging connection may select an accumulator for adding. Another single connection will select the accumulator for subtracting and these connections may be selectively activated to cause the accumulator to perform adding or subtracting operations in response to predetermined control perforations in the record cards analyzed.

*Plugboard arrangement.*—Referring to Figs. 1 and 31, each of the subtracting accumulators has associated therewith five plug sockets 415, which, when connected, as through connections 416, to one of the sockets of a group of sockets 417, will condition the accumulator for adding. A further group of five sockets 418 associated with each accumulator may be connected to sockets 417 through connections 419 to condition the accumulator for subtracting. A further socket 420 is associated with each of the subtracting accumulators and when connected to one of the sockets 415 by a connection 421, as indicated for accumulator #2 in Fig. 1, will cause the accumulator having such connection, to add data from all the record cards which are connected for entry into that accumulator.

The machine is provided with five double plug sockets, designated X1, X2, X3, X4, and X5 in Figs. 1, 29b and 31, which are adapted to be connected to any of the upper brush sockets 301 by means of plug connections such as 422.

*"X" control circuit.*—As a record card passes the upper brushes, a perforation in the "X" index point position of a column in which a plug connection 422 has been made, let us say for example, the plug connection shown in Fig. 31, between socket 301 in the seventy-second position and plug socket X4; a circuit will be completed from line 334, in known manner, to socket 301 and thence through connection 422 to socket X4 (Fig. 29b), cam contacts L21 which close at the "X" index point position, thence in parallel through multi-contact relay magnet 423 and a relay magnet 424, wire 411, upper card lever relay contacts UCLd to line 335.

Magnet 424 will close its contacts 424a, setting up a holding circuit for magnets 423 and 424 which extends from line 334, contacts L25, wire 412, contacts 424a, magnets 423 and 424, wire 411, upper card lever relay contacts UCLd to line 335. The magnets 423 associated with the other plug sockets X1, X2, X3, and X5 may be energized in response to "X" perforations in any other columns of the record card and it will be understood that any one or all of the magnets 423 may be energized depending upon whether one or all of the selected positions contain an "X" perforation. Thus, as shown in Fig. 31, where four connections 422 are separately made to sockets 301 in the seventy-second, seventy-third, seventy-fifth and seventy-sixth positions, if a record card contains "X" perforations in all of these positions, the magnets 423 associated with X1, X2, X3 and X4 plug sockets will be energized.

Each of the magnets 423 controls a group of five sets of contacts 423a, 423b, which are normally positioned as indicated in Fig. 29b. Energization of any of the magnets 423 will shift its related contacts 423a and 423b to closed and open positions respectively. The right hand blades of all the contacts 423a are wired to the plug sockets 417 and the left hand blades of contacts 423b are wired to the center blades of the next higher set of contacts.

The contacts 423a and 423b control the selection and operation of the multi-contact relay magnets 393 and 395, whose contacts are in the entering circuits of the subtracting accumulators, as explained in connection with Fig. 29a.

*Adding control circuits.*—If a plug connection 416 is made between one of the sockets 417 and a socket 415, a circuit will be completed, if the contact 423a to whose socket 417 the plug connection is made, is closed by virtue of an "X" control perforation in a related column. Specifically, if as the record card passes the upper brushes an "X" perforation in a column plug-connected to the X4 socket will energize the related magnet 423 which will then hold its contacts 423a closed as the card traverses the lower brushes. Prior to the analysis of the card by the lower brushes, cam contacts L26 close and complete a circuit from line 334 (Fig. 29b), cam contacts L25, wire 412, contacts L26, upper card lever relay contacts UCLe, contacts 423b of the X5 group, closed contacts 423a in the X4 group, plug socket 417, plug connection 416, socket 415 of accumulator #4, magnet 393 to line 335. Magnet 393 will shift its related contacts 393d to provide a holding circuit from line 334, cam contacts L27, wire 425, contacts 393d, magnet 393, to line 335.

Inspection of the timing diagram (Fig. 30) will disclose that the circuits through the magnets 423 and 424 controlled by the cam contacts L18 to L22 are momentary and arranged to be initially completed at the "X" point in the cycle and that immediately upon completion of these circuits, cam contacts L25 hold them so that the subsequent closure of contact L26 in the same cycle will cause the energization of the selected magnets 393 and 395 which in turn pick up their holding circuits through contacts L27 and these contacts will hold the circuits through the magnets 393 and 395 throughout the entering portion of the next succeeding cycle. With this arrangement, the circuits to the magnets 423 and 424 need only be momentary and it will be apparent that the timing of the contacts L18 to L22 may be so adjusted that the controlling perforations may be made in positions other than the "X" position.

For instance, if these contacts were timed to close at "0" or "1" position or both of them in addition to the "X" position, perforations in the record cards in these index positions would act to control the machine in the same manner as explained in connection with the perforations in the "X" position. This circuit is maintained by contacts L27 until after the entering portion of the following cycle. It therefore follows, as explained in connection with Fig. 29a, that data analyzed by those lower brushes which are connected to accumulator #4 will enter such data additively into the accumulator.

*Subtraction control circuit.*—If the plug socket 417 were connected to one of the sockets 418 of accumulator #4, a circuit substantially similar to that just traced will energize magnet 395 associated with accumulator #4, setting up a holding circuit and conditioning accumulator #4 to enter the complementary value of the data analyzed by the lower brushes.

*Selection for adding only.*—If an accumulator is to be conditioned for additive entries only, the plug connection 421 is made between the plug socket 420 associated with that accumulator and one of the sockets 415 so that a circuit will be completed during entering portions of the cycle which is traceable from line 334, cam contacts L27, upper card lever relay contacts UCLg, socket 420, connection 421, socket 415, relay magnet 393, to line 335. This circuit will be completed for each card feeding cycle so that the contacts controlled by magnet 393 will condition the accumulator for additive entering operations during all card feeding cycles.

*Successive "X" control.*—It is to be noted in Fig. 29b that the electrical connections between contacts 423b of one set and the contacts of the next set directly above are such that each set of contacts controls the circuits to the next set above; for instance, if the X5 contacts 423a are closed and contacts 423b open, circuits can only be completed through the X5 group of sockets 417. It follows therefore that a circuit through any plug socket 417, let us say for example, socket 417 associated with the X2 group, can be completed only when the X3, X4 and X5 groups of contacts remain in the position shown in Fig. 29b; that is, the X2 contacts are effective to control the operation of the accumulators only when the higher order contacts are inoperative.

The coordination of the various accumulator selecting connections and the simplicity of their manipulation is best illustrated in Fig. 31 where a section of the plugboard is arranged to permit entering of data from record card columns 55 to 60 into accumulator #4. Plug connections 303 are made from plug sockets 300 of these card columns to the appropriate denominational order sockets 302 of accumulator #4. The upper brush socket associated with the seventy-second column of the record card is connected, as by a plug connection 422, with the X4 plug socket; the seventy-third column is connected to the X3 socket; the seventy-fifth column is connected to the X2 column; and the seventy-sixth column is connected to the X1 socket. Connections 416 and 419 are made between sockets 417 and sockets 415 and 418, as shown. These connections 416 and 419 are duplicated in Fig. 29b to show the devices which they connect.

With the arrangement shown in Fig. 31, accumulator #4 will add data from all record cards which are "X" punched in the seventy-second and seventy-third columns and will subtract the data from all cards which are "X" punched in the seventy-fifth and seventy-sixth columns. In addition, the data from all cards which have no "X" punching in any of the four selected columns will be added. It may happen in accordance with the organization of the particular accounting system in which cards are so perforated that either one or all of the columns may be "X" punched. However, as pointed out above, the column connected to the highest order "X" socket will take precedence in controlling the selection of the accumulator. Specifically, in the problem mentioned in connection with Fig. 31, a record card "X" punched in columns 72, 73, 75 and 76 will control the accumulator to add the data under control of the perforation in the seventy-second column. The control of the other columns is ineffectual due to the opening of the contacts 423b in the X4 position which prevents the completion of circuits to the other sets of contacts. It is apparent that by reversing the order of connection between the sockets X1 to X4 and the sockets 301 that the "X" punching in the seventy-sixth column may be the predominating controlling factor.

A further example of a simplified plugging arrangement, whereby data may be additively entered into an accumulator from certain cards, subtractively entered from others, and not taken at all from still others, will now be explained in connection with Fig. 32.

With plug connections 422, 416, 419 and 303, data will be entered from the fifty-fifth to sixtieth columns, inclusive, of the record cards into accumulator #4, under control of the distributing device. Those cards which have an "X" punching in either columns 72 or 74 will cause the amounts to be directly added from such cards. Those which have an "X" punching in the seventy-sixth column will have their amounts subtracted from the accumulator. Those cards which have an "X" punching in the seventieth column or which have no "X" punching in any of the plug connected columns 70, 72, 74 or 76, will have their data eliminated; that is, the data in columns 55 to 60 of these cards will not be entered into the accumulator. It is to be noted in connection with Fig. 29b that if the X5 socket is connected to any column, as column 70 in Fig. 32, the "X" punching in this column will take precedence over "X" punchings in other columns, as explained above. Therefore, in the example illustrated in Fig. 32, if a record card has an "X" punched in the seventieth column and also in one or more of the other columns, the data on the card will be eliminated. Also, such cards as have "X" punching in the seventy-fourth and seventy-sixth columns will be added since the "X" punching in the seventy-fourth column will take precedence over that in the seventy-sixth.

In Fig. 33 is shown an example of plug connections which may be made when it is desired to enter data from a field of the record cards into two separate accumulators so that data of one classification will be separately accumulated in one accumulator and data of another class, in a second accumulator, where the data in either class may be positive or negative data. Specifically, the plugging arrangement of Fig. 33 provides for entering data from columns 51 to 53 through the class selecting device by connection to plug sockets 323 and thence transmitting it through sockets 322 to accumulator #4 and sockets 321 to accumulator #5.

This is effected by means of the class selection device, as explained in detail above, which is controlled through a plug connection 328 to the plug socket 301 of column 60. Thus, record cards which are "X" punched in column 60 will cause their data to be entered in accumulator #4 and those which are not "X" punched in column 60 will cause their data to be entered into accumulator #5. An "X" punching in the seventieth column in which a connection 422 is made will determine whether the information distributed under control of column sixty is to be additively or subtractively entered. An "X" punching in column seventy will cause either accumulator (as selected by "X" punching in column 60) to subtract and the absence of a perforation in column seventy will cause either to add in a similar manner.

In this manner the two columns 60 and 70 will control entries under four different conditions, to wit:

Cards "X" punched in the seventieth column only will be subtracted from accumulator #5.

Cards "X" punched in columns 70 and 60 will be subtracted from accumulator #4.

Cards "X" punched in the sixtieth column only will be added in accumulator #4, and Cards that are "X" punched in neither the sixtieth nor seventieth columns will be added in accumulator #5.

With this arrangement, both positive and negative items of one classification may be handled in one accumulator and similar items of another classification may be separately handled by a second accumulator where both classes are derived from the corresponding fields of the successive record cards.

Fig. 34 illustrates a plugging arrangement for balance selection where the balance derived from a group of cards may be either positive or negative and making it desirable to accumulate all positive items and the complements of negative items in one accumulator and all negative items and complements of positive items in another accumulator.

In the arrangement shown in Fig. 34, data will be entered from columns 58 to 60 into accumulators #4 and #5 and an "X" punching in column 70 will indicate negative items so that for those cards which are "X" punched in the seventieth column, accumulator #4 will be conditioned to subtract and accumulator #5 will be conditioned to add and for those cards which have no "X" punching in the seventieth column, accumulator #4 will add and accumulator #5 will subtract. As explained above, total printing may take place from both accumulators in which case, one will control the printing of the positive number and the other the complement thereof. However, by means of the balance selection devices already explained, the printing from the accumulator containing the complement may be suppressed and printing take place only from the accumulator having the true positive balance as in the example of Fig. 36.

*Modification*

Fig. 35 illustrates the arrangement of a modified form of connection between the contacts 324a and 324b whereby the "X" punchings in control columns of the card may be arranged for independent control of the associated accumulator, or, if desired, may be arranged for successive control in the manner outlined in connection with the several previous examples. The modification consists essentially in providing plug sockets 427 and 428, as indicated in Fig. 35, which may be connected by plug connections 429 (Fig. 35a) for successive "X" controlling in the manner already described.

Sockets 428 may also be connected by plug connections 431 (see also Fig. 35b) to an associated socket 432 so that circuits may be completed through the contacts 423a and 423b in any position without regard to the setting of the contacts in the next lower order. The operation of the device as modified may best be explained in connection with a specific problem, for instance, that of stock control in an industrial establishment.

Figure 28:
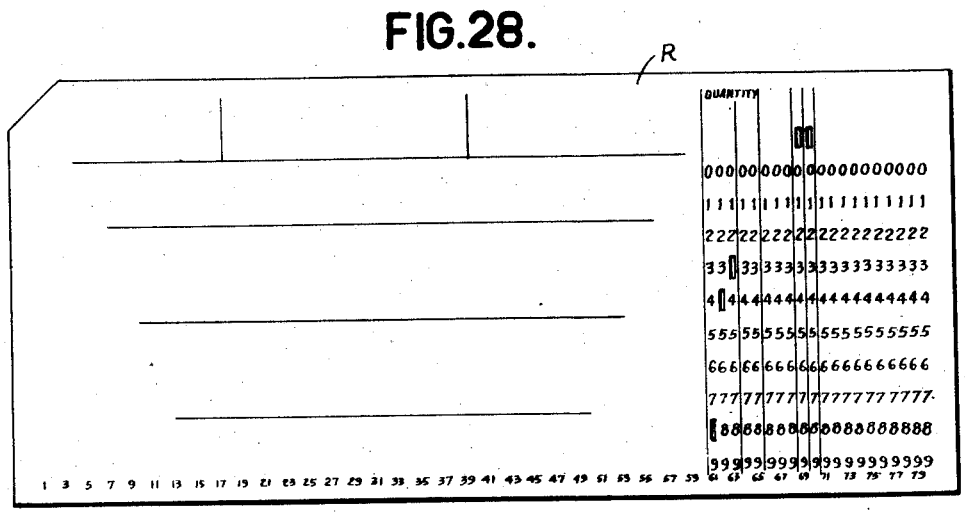
Fig. 28 is a detail of a record card.

Assuming that the record cards are punched in a selected field as in Fig. 28 to represent a quantity of stock and that cards which have no "X" punching represent quantities actually on hand or entering stock. Cards "X" punched in the seventieth column represent quantities taken out of stock. Cards "X" punched in the sixty-ninth column represent quantities on order; and cards "X" punched in the sixty-ninth and seventieth columns represent quantities in reserve. With this manner of identifying the various quantities of a particular commodity, it may be desirable to concurrently obtain from the machine a balance representing a physical inventory of stock on hand and a separate inventory of stock available which would include stock on order.

The plugging arrangement for this purpose will be as illustrated in Fig. 35 and on the modified plugboard in Fig. 38. The entries into the accumulators will be in accordance with the following table:

Accumulator #2 will add cards which have no "X" punching in the 70th column and subtract cards which have an "X" punching in the 70th column, if there is no "X" perforation in the 69th column.

Accumulator #3 will add cards "X" punched in the 70th column, if there is no accompanying "X" punching in the 69th column and will subtract cards which have no "X" punching in the 70th column.

Accumulator #4 will add all cards having no "X" punching in the 70th column and subtract cards having "X" punching in the 70th column, irrespective of whether or not there is an "X" punched in the 69th column.

Accumulator #5 will add all cards punched "X" in the 70th column and subtract all cards which have no "X" punched in the 70th column irrespective of whether or not there is an "X" punched in the 69th column.

With the plugging arrangement shown, accumlators #2 and #3 will give an actual physical inventory; that is, they will show the balance of stock on hand as obtained from the cards punched X70 or No. X70 and accumulators #4 and #5 will represent the inventory of the entire stock available and this balance will be obtained from data derived from all cards "X" punched as explained.

The plugging connections on Fig. 35 will be briefly explained. A plug connection 433 is made between the X2 and X4 control sockets and the X4 socket is connected by a suitable connection 422, as indicated, to the plug socket 301 associated with the seventieth column and the X3 socket is suitably connected to the socket 301 in the sixty-ninth column. These connections are shown in Fig. 38. It will be apparent from the previous explanation that an "X" perforation in the sixty-ninth column of a card will cause shifting of the group of contacts 423a and 423b associated with the X3 socket and an "X" perforation in the seventieth column will cause shifting of the contacts in both the X2 and X4 positions. Specifically, a record card which is "X" punched in the seventieth column only will cause shifting of the X2 and X4 groups of contacts so that upon closure of cam contacts L27, a circuit will be completed which is traceable from line 334, cam contacts L27, upper card lever contacts UCLg, plug sockets 420, wire 434, plug socket 432 in the X3 position, plug connection 431, closed contacts 423b, plug connection 429, contacts 423a in the X2 position, plug sockets 430, plug connections 435 and 436 to a plug socket 418 of accumulator #2 and socket 415 of accumulator #3, respectively.

A parallel circuit will be traceable from wire 434, plug socket 432 in the X4 position, plug connection 431, sockets 428, contacts 423a, now closed, to plug sockets 430 and thence through connections 437 to socket 418 of accumulator #4 and socket 415 of accumulator #5, through a plug connection 438. These circuits will energize the associated accumulator controlling magnets 393 and 395 in a known manner so that the accumulators will be conditioned to add or subtract in accordance with the operation of the circuits just traced.

Inspection of Fig. 35 will show that the X4 group of contacts 423a and 423b will control the operation of accumulators #4 and #5 in accordance with the presence or absence of an "X" punching in the seventieth column and will do so wholly independently of a perforation in any other position. The plug connection 429 between the X2 and X3 groups of contacts provides for control of accumulators #2 and #3 under successive control of the X69 and X70 columns; that is, if a record card has an X69 punching, no circuits whatever can be completed to the magnets 393 and 395 of the second and third accumulators. This operation is the successive control which has previously been explained in more detail.

*Group indicating connection.*—The modification shown in Figs. 35 and 38 further discloses a group of plug sockets 440, one of which is provided for each of the accumulators and located as indicated in Fig. 38. If a plug connection 441 is made between one of the plug sockets 440 and a socket 415 of an accumulator as indicated by dotted line 441 in Figs. 35 and 38, an entry will be made into the selected accumulator from the first card only of a group and entries from other cards of the group will be suppressed. This action is brought about as follows:

A cam contact P11 which is timed to close near the end of a total taking and resetting cycle, will complete a circuit from line 334, cam contacts L27, lower card lever contact LCLj, closed if there is a card at the lower brushes, cam contacts P11, plug socket 440, plug connection 441, plug socket 415, magnet 393, to line 335. Magnet 393 will set up its own holding circuit so that magnet 393 remains energized throughout the entering portion of the first card cycle of the following group and permits entry of data additively into the accumulator since contact P11 opens at the end of the resetting cycle and the holding circuit to magnet 393 is broken after the entering portion of the first card cycle. No further entries can be made into the accumulator and the first card entry will be held therein until total taking operations, when it will be printed.

With this arrangement, group indicating may be effected under control of an accumulator with a minimum of plugging and a great many of the plug connections which are necessary for this purpose in the preferred form of the invention can be eliminated. It will simply be necessary to plug connect the lower brush sockets 300 of the field which is to group indicate, to the appropriate accumulator plug sockets 302 and then insert the single connection 441 between the socket 440 and one of the sockets 415 of the selected accumulator.

While there has been shown and described and pointed out the fundamental novel features of the invention as applied to two modifications, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is as follows:

1. In a machine of the class described, an accumulator, record analyzing means adapted to control the entry of data into said accumulator, further analyzing means adapted to analyze predetermined positions of the record, settable means associated therewith and responsive thereto to cause the accumulator to add in response to the analysis of a perforation in one of said predetermined positions and to subtract in response to the analysis of a perforation in another position and means cooperating with said settable means for causing a perforation in either position to effect control of the accumulator to the exclusion of the other.

2. In a machine of the class described, an accumulator, means for analyzing a plurality of predetermined positions of a record card for perforations, settable means associated with said analyzing means to cause the accumulator to add in response to a perforation in one position, to subtract in response to a perforation in a second position and to suppress the operation of the accumulator in response to a perforation in a third position and means cooperating with said settable means for causing a perforation in any of said positions to effect control of the accumulator to the exclusion of the other of said perforations.

3. In a machine of the class described, means for analyzing a field of a record card for data entries therein, an accumulator, means for associating said analyzing means with said accumulator for control thereof in accordance with said entries, analyzing means for analyzing a predetermined position of the record card and selectively settable means associated with said last named analyzing means for causing said accumulator to add, subtract or suppress entries entirely, in response to the analysis of a designation in said predetermined position of the record card.

4. In a machine of the class described, a record analyzing device including a reading brush; an adding magnet, a subtracting magnet, a normally open circuit extending from each magnet to said brush, a printing magnet and a normally closed circuit extending therefrom to said brush, record controlled means for selectively completing one of said normally open circuits and settable means for causing opening of said normally closed circuits whereby data read by said brush will be added or subtracted without accompanying printing thereof.

5. In a machine of the class described, a plurality of accumulators, means for entering items therein to accumulate minor totals on one and major totals on another, total taking mechanism controlled by the accumulators to print the totals standing therein, settable means and means controlled thereby to cause said accumulators to control said total taking mechanism to concurrently print the minor and major totals standing in the accumulators or to cause printing thereof in succession.

6. In a machine of the class described, accumulators, resetting mechanism therefor, group control mechanism operative upon a change in certain group classification data to initiate an operation of said resetting mechanism and settable means positionable to cause said control mechanism upon a change in the same group classification data to initiate either a single cycle of operations or a plurality of cycles of operations of said resetting mechanism.

7. In a machine of the class described, means for reading a field of a record card, a plurality of accumulators, means for associating said reading means with said accumulators for control by a selected field of a record, a device for causing said accumulators to add all entries made in said field, a device for causing said accumulators to subtract all entries made in said field and means including a single electrical connection for selecting one of said accumulators and for selecting one of said devices for controlling the selected accumulator.

8. In a machine of the class described, means for successively reading a field of a group of record cards, an accumulator, means for associating said reading means with said accumulator for control by a selected field of a group of records, a device for causing said accumulator to add all entries made in said fields, a device for causing said accumulator to add only the entry made in the field of the first card of a group and means including a single electrical connection for causing either device to control the operation of the accumulator.

9. In a machine of the class described, means for analyzing a field of a record card for four classes of items comprising two classes of negative items and two classes of positive items, an accumulator, record controlled means for causing all positive items to be additively entered into said accumulator, and all negative items to be subtractively entered into said accumulator, a second accumulator and means for causing only one class of positive items to be additively entered into said second accumulator and only one class of negative items to be subtractively entered into said second accumulator, whereby said first accumulator will record a balance of all items and the second accumulator will record a balance of only a portion of the items.

10. In a machine of the class described, an accumulator, record analyzing means adapted to control the entry of data into said accumulator, further analyzing means adapted to analyze a plurality of predetermined positions of the record, settable means associated therewith and responsive thereto to cause the accumulator to add in response to the analysis of a perforation in one of said predetermined positions and to subtract in response to the analysis of a perforation in another position and means cooperating with said settable means to cause the accumulator to add in response to the analysis of perforations in all predetermined positions.

11. The invention as set forth in claim 10 in which the settable means is arranged to cause the accumulator to subtract in response to the analysis of perforations in both said predetermined positions.

12. In a machine of the class described, an accumulator, dual record analyzing means for successively analyzing records in motion, controlling means for causing said accumulator to effect direct adding operations, further controlling means for causing the accumulator to effect complementary adding operations, means controlled by one of said analyzing means for selectively causing the operation of either of said controlling means for determining whether the accumulator shall add directly or complementarily, and means subsequently controlled by the other analyzing means for entering the data from the record in the selected manner.

13. In a machine of the class described, an accumulator including a magnet for controlling direct entries and a magnet for controlling complementary entries, a normally open operating circuit for each, record analyzing means connected to both said circuits and adapted to partially complete both in response to a perforation in the record, and means for completing one of said circuits accordingly as the accumulator is to receive direct or complementary entries.

14. In a machine of the class described, an accumulator including a magnet for controlling direct entries and a magnet for controlling complementary entries, a normally open operating circuit for each magnet, analyzing means associated with said circuits and record controlled means for selectively causing completion of one of said circuits whereby said analyzing means will be connected to one of said magnets.

15. In a machine of the class described, a record analyzing device including a reading brush; a direct-adding magnet, a magnet for controlling complementary adding, a normally open circuit extending from each magnet to said brush and record controlled means for selectively closing one of said circuits for control of its associated magnet by said brush.

16. In a machine of the class described, a record analyzing device including a reading brush; an adding magnet, a subtracting magnet, a normally open circuit extending from each magnet to said brush, a printing magnet and a normally closed circuit extending therefrom to said brush, record controlled means for selectively completing either of said normally open circuits and means for opening said normally closed circuit when said subtracting magnet circuit is completed whereby data read by said brush will be added with accompanying printing and subtracted without accompanying printing thereof.

CLAIR D. LAKE.
GEORGE F. DALY.